United States Patent
George et al.

(10) Patent No.: US 10,110,305 B2
(45) Date of Patent: Oct. 23, 2018

(54) EXTREMELY HIGH FREQUENCY (EHF) DISTRIBUTED ANTENNA SYSTEMS, AND RELATED COMPONENTS AND METHODS

(71) Applicant: Corning Optical Communications LLC, Hickory, NC (US)

(72) Inventors: Jacob George, Horseheads, NY (US); Anthony Ng'Oma, Horseheads, NY (US); Alranzo Boh Ruffin, Painted Post, NY (US); Michael Sauer, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/790,676

(22) Filed: Oct. 23, 2017

(65) Prior Publication Data

US 2018/0062743 A1    Mar. 1, 2018

Related U.S. Application Data

(63) Continuation of application No. 15/440,646, filed on Feb. 23, 2017, now Pat. No. 9,800,339, which is a (Continued)

(51) Int. Cl.
*H04B 10/00*     (2013.01)
*H04B 10/2575*   (2013.01)
(Continued)

(52) U.S. Cl.
CPC ....... *H04B 10/25751* (2013.01); *H04B 7/022* (2013.01); *H04B 10/25759* (2013.01);
(Continued)

(58) Field of Classification Search
CPC .......... H04B 10/2575; H04B 10/25751; H04B 10/25752; H04B 10/25753; H04B 10/25759; H04W 88/085; H04W 24/04
(Continued)

(56) References Cited

U.S. PATENT DOCUMENTS 1,280,393 A    10/1918  Cannon
1,703,255 A    2/1929   Wagner
(Continued)

FOREIGN PATENT DOCUMENTS

CN    2893724 Y    4/2007
DE    4130706 A1   3/1993
(Continued)

OTHER PUBLICATIONS

Non-final Office Action for U.S. Appl. No. 12/417,250 dated Jun. 23, 2011, 9 pages.
(Continued)

*Primary Examiner* — Hanh Phan
(74) *Attorney, Agent, or Firm* — C. Keith Montgomery

(57) ABSTRACT

Extremely High Frequency (EHF) distributed antenna systems and related components and methods are disclosed. In one embodiment, a base unit for distributing EHF modulated data signals to a RAU(s) is provided. The base unit includes a downlink data source input configured to receive downlink electrical data signal(s) from a data source. The base unit also includes an E-O converter configured to convert downlink electrical data signal(s) into downlink optical data signal(s). The base unit also includes an oscillator configured to generate an electrical carrier signal at a center frequency in the EHF band. The base unit also includes a modulator configured to combine the downlink optical data signal(s) with the electrical carrier signal to form downlink modulated optical signal(s) comprising a downlink optical data signal(s) modulated at the center frequency of the electrical carrier signal. The modulator is further configured to send the downlink modulated optical signal to the RAU(s).

20 Claims, 6 Drawing Sheets

Related U.S. Application Data continuation of application No. 14/947,187, filed on Nov. 20, 2015, now Pat. No. 9,602,209, which is a continuation of application No. 14/300,541, filed on Jun. 10, 2014, now Pat. No. 9,219,546, which is a continuation of application No. PCT/US2011/064428, filed on Dec. 12, 2011.

(51) Int. Cl.
*H04B 7/022* (2017.01)
*H04J 14/02* (2006.01)
*H04Q 11/00* (2006.01)
*H04W 84/12* (2009.01)

(52) U.S. Cl.
CPC ...... *H04J 14/0298* (2013.01); *H04Q 11/0005* (2013.01); *H04Q 2011/0016* (2013.01); *H04Q 2011/0035* (2013.01); *H04Q 2011/0037* (2013.01); *H04W 84/12* (2013.01)

(58) Field of Classification Search
USPC ... 398/115, 116, 117, 66, 67, 68, 69, 70, 71, 398/72, 79, 182, 183, 187, 186, 98, 99, 398/100; 370/328, 329, 338, 352, 392, 370/468, 389; 455/561, 562.1, 445, 422
See application file for complete search history.

(56) References Cited

U.S. PATENT DOCUMENTS

| | | |
|---|---|---|
| 2,003,147 A | 5/1935 | Holm-Hansen |
| 2,044,073 A | 6/1936 | Hurley |
| 2,131,408 A | 9/1938 | Murrer |
| 2,428,149 A | 9/1947 | Falk |
| 2,681,201 A | 6/1954 | Grunwald |
| 2,984,488 A | 5/1961 | Kirchner |
| 3,054,994 A | 9/1962 | Haram |
| 3,089,915 A | 5/1963 | Plummer |
| 3,204,867 A | 9/1965 | Wahlbom |
| 3,435,124 A | 3/1969 | Channell |
| 3,663,762 A | 5/1972 | Joel, Jr. |
| 3,880,390 A | 4/1975 | Niven |
| 4,006,540 A | 2/1977 | Lemelson |
| 4,012,010 A | 3/1977 | Friedman |
| 4,073,560 A | 2/1978 | Anhalt et al. |
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |
| 4,244,544 A | 1/1981 | Kornat |
| 4,261,529 A | 4/1981 | Sandberg et al. |
| 4,261,644 A | 4/1981 | Giannaris |
| 4,391,303 A | 7/1983 | Holgersson |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,573,212 A | 2/1986 | Lipsky |
| 4,579,310 A | 4/1986 | Wells et al. |
| 4,586,675 A | 5/1986 | Brown |
| 4,595,255 A | 6/1986 | Bhatt et al. |
| 4,611,887 A | 9/1986 | Glover et al. |
| 4,697,873 A | 10/1987 | Bouvard et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,812,004 A | 3/1989 | Biederstedt et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,939,819 A | 7/1990 | Moyer |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,007,701 A | 4/1991 | Roberts |
| 5,023,646 A | 6/1991 | Ishida et al. |
| 5,048,916 A | 9/1991 | Caron |
| 5,048,926 A | 9/1991 | Tanimoto |
| 5,057,646 A | 10/1991 | Nichols et al. |
| 5,059,927 A | 10/1991 | Cohen |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,121,458 A | 6/1992 | Nilsson et al. |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | MacHall et al. |
| 5,209,441 A | 5/1993 | Satoh |
| 5,210,374 A | 5/1993 | Channell |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,261,020 A | 11/1993 | de Jong et al. |
| 5,265,187 A | 11/1993 | Morin et al. |
| 5,271,585 A | 12/1993 | Zetena, Jr. |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,463,186 A | 10/1995 | Schricker |
| 5,473,115 A | 12/1995 | Brownlie et al. |
| 5,479,553 A | 12/1995 | Daems et al. |
| 5,479,554 A | 12/1995 | Roberts |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,579,425 A | 11/1996 | Lampert et al. |
| 5,590,234 A | 12/1996 | Pulido |

(56) References Cited

U.S. PATENT DOCUMENTS

| | | |
|---|---|---|
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,706,384 A | 1/1998 | Peacock et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,737,475 A | 4/1998 | Regester |
| 5,751,882 A | 5/1998 | Daems et al. |
| 5,758,004 A | 5/1998 | Alarcon et al. |
| 5,764,843 A | 6/1998 | Macken et al. |
| 5,774,612 A | 6/1998 | Belenkiy et al. |
| 5,775,648 A | 7/1998 | Metzger |
| 5,777,771 A * | 7/1998 | Smith .............. H04B 10/25758 398/182 |
| 5,778,132 A | 7/1998 | Csipkes et al. |
| 5,781,678 A | 7/1998 | Sane et al. |
| 5,790,631 A | 8/1998 | Minarczik et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,867,763 A | 2/1999 | Dean et al. |
| 5,870,519 A | 2/1999 | Jenkins et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,220,413 B1 | 4/2001 | Walters et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,245,998 B1 | 6/2001 | Curry et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | Buabbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,351,592 B1 | 2/2002 | Ehn et al. |
| 6,353,696 B1 | 3/2002 | Gordon et al. |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,404,775 B1 | 6/2002 | Leslie et al. |
| 6,411,767 B1 | 6/2002 | Burrous et al. |
| 6,414,624 B2 | 7/2002 | Endo et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,525,855 B1 * | 2/2003 | Westbrook ............. H04B 10/29 398/115 |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,570,913 B1 | 5/2003 | Chen |

(56) References Cited

U.S. PATENT DOCUMENTS

| | | |
|---|---|---|
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,674,952 B2 | 1/2004 | Howell et al. |
| 6,710,366 B1 | 3/2004 | Lee et al. |
| 6,711,339 B2 | 3/2004 | Puetz et al. |
| 6,714,800 B2 | 3/2004 | Johnson et al. |
| 6,715,619 B2 | 4/2004 | Kim et al. |
| 6,717,058 B2 | 4/2004 | Booth et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,804,447 B2 | 10/2004 | Smith et al. |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,232 B1 | 3/2005 | Isaksson et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,909,893 B2 | 6/2005 | Aoki et al. |
| 6,915,058 B2 | 7/2005 | Pons |
| 6,915,059 B2 | 7/2005 | Daoud et al. |
| 6,915,529 B1 | 7/2005 | Suematsu et al. |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,932,514 B2 | 8/2005 | Anderson et al. |
| 6,934,451 B2 | 8/2005 | Cooke et al. |
| 6,937,807 B2 | 8/2005 | Franklin et al. |
| 6,946,605 B2 | 9/2005 | Levesque et al. |
| 6,946,989 B2 | 9/2005 | Vavik |
| 6,967,347 B2 | 11/2005 | Estes et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,002,511 B1 | 2/2006 | Ammar et al. |
| 7,006,748 B2 | 2/2006 | Dagley et al. |
| 7,027,695 B2 | 4/2006 | Cooke et al. |
| 7,054,513 B2 | 5/2006 | Hertz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |
| 7,128,470 B2 | 10/2006 | Scherer et al. |
| 7,130,519 B2 | 10/2006 | Grubish et al. |
| 7,139,462 B1 | 11/2006 | Richtman |
| 7,142,763 B2 | 11/2006 | Frohlich et al. |
| 7,142,764 B2 | 11/2006 | Allen et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,011 B2 | 10/2007 | Bayar et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,340,001 B2 | 3/2008 | Smith et al. |
| 7,348,843 B1 | 3/2008 | Qiu et al. |
| 7,349,616 B1 | 3/2008 | Castonguay et al. |
| 7,349,634 B2 * | 3/2008 | Sasai ............ H04B 10/25753 398/115 |
| 7,369,741 B2 | 5/2008 | Reagan et al. |
| 7,376,325 B1 | 5/2008 | Cloud et al. |
| 7,379,650 B2 | 5/2008 | Weinert et al. |
| 7,379,669 B2 | 5/2008 | Kim |
| 7,406,241 B1 | 7/2008 | Opaluch et al. |
| 7,406,242 B1 | 7/2008 | Braga |
| 7,412,145 B2 | 8/2008 | Honma et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,454,222 B2 | 11/2008 | Huang et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,489,641 B2 | 2/2009 | Miller et al. |
| 7,496,269 B1 | 2/2009 | Lee |
| 7,509,016 B2 | 3/2009 | Smith et al. |
| 7,522,805 B2 | 4/2009 | Smith et al. |
| 7,522,806 B2 | 4/2009 | Hendrickson et al. |
| 7,526,174 B2 | 4/2009 | Leon et al. |
| 7,548,680 B2 | 6/2009 | Castonguay et al. |
| 7,565,080 B2 | 7/2009 | Mickelsson et al. |
| 7,583,896 B2 | 9/2009 | Taniguchi et al. |
| 7,593,704 B2 | 9/2009 | Pinel et al. |
| 7,599,672 B2 | 10/2009 | Shoji et al. |
| 7,609,967 B2 | 10/2009 | Hochbaum et al. |
| 7,613,376 B2 | 11/2009 | Wright et al. |
| 7,623,749 B2 | 11/2009 | Reagan et al. |
| 7,630,608 B2 | 12/2009 | Gallagher |
| 7,636,507 B2 | 12/2009 | Lu et al. |
| 7,664,361 B2 | 2/2010 | Trebesch et al. |
| 7,672,591 B2 | 3/2010 | Soto et al. |
| 7,690,848 B2 | 4/2010 | Faika et al. |
| 7,697,574 B2 | 4/2010 | Suematsu et al. |
| 7,728,225 B2 | 6/2010 | Anderson et al. |

(56) References Cited

U.S. PATENT DOCUMENTS

| | | |
|---|---|---|
| 7,756,379 B2 | 7/2010 | Kowalczyk et al. |
| 7,766,732 B2 | 8/2010 | Hauville |
| 7,769,265 B2 | 8/2010 | Cairns |
| 7,787,823 B2 | 8/2010 | George et al. |
| 7,812,775 B2 | 10/2010 | Babakhani et al. |
| 7,816,602 B2 | 10/2010 | Landry et al. |
| 7,822,310 B2 | 10/2010 | Castonguay et al. |
| 7,826,705 B2 | 11/2010 | McGranahan et al. |
| 7,844,161 B2 | 11/2010 | Reagan et al. |
| 7,874,411 B2 | 1/2011 | Roberts et al. |
| 7,880,677 B2 | 2/2011 | Rofougaran et al. |
| 7,881,753 B2 | 2/2011 | Rofougaran |
| 7,889,961 B2 | 2/2011 | Cote et al. |
| 7,912,506 B2 | 3/2011 | Lovberg et al. |
| 7,936,960 B2 | 5/2011 | McGranahan |
| 7,965,837 B2 | 6/2011 | Kawasaki et al. |
| 7,970,249 B2 | 6/2011 | Solheid et al. |
| 7,974,509 B2 | 7/2011 | Smith et al. |
| 8,023,792 B2 | 9/2011 | Ciechomski et al. |
| 8,023,886 B2 | 9/2011 | Rofougaran |
| 8,023,997 B2 | 9/2011 | Hoiness et al. |
| 8,027,656 B2 | 9/2011 | Rofougaran et al. |
| 8,073,329 B2 | 12/2011 | Gao et al. |
| 8,086,085 B2 | 12/2011 | Lu et al. |
| 8,107,815 B2 | 1/2012 | Akasaka et al. |
| 8,135,257 B2 | 3/2012 | Cooke et al. |
| 8,265,447 B2 | 9/2012 | Loeffelholz et al. |
| 8,280,217 B2 | 10/2012 | Lapp et al. |
| 8,351,754 B2 | 1/2013 | Bell |
| 8,351,792 B2 | 1/2013 | Zheng |
| 8,374,508 B2 | 2/2013 | Soto et al. |
| 8,380,036 B2 | 2/2013 | Smith |
| 8,422,883 B2 | 4/2013 | Yeh et al. |
| 8,437,595 B2 | 5/2013 | Womack et al. |
| 8,452,178 B2 | 5/2013 | Gao et al. |
| 8,465,317 B2 | 6/2013 | Gniadek et al. |
| 8,467,651 B2 | 6/2013 | Cao et al. |
| 8,488,966 B2 | 7/2013 | Zheng |
| 8,520,996 B2 | 8/2013 | Cowen et al. |
| 8,599,958 B2 | 12/2013 | Schwarz et al. |
| 8,613,030 B2 | 12/2013 | Kossin et al. |
| 8,630,300 B2 | 1/2014 | Edmon |
| 8,660,397 B2 | 2/2014 | Giraud et al. |
| 8,712,206 B2 | 4/2014 | Cooke et al. |
| 8,792,767 B2 | 7/2014 | Fabrykowski et al. |
| 8,798,427 B2 | 8/2014 | Cox et al. |
| 8,879,882 B2 | 11/2014 | Conner et al. |
| 8,909,019 B2 | 12/2014 | Fabrykowski et al. |
| 8,976,670 B2 | 3/2015 | Meier et al. |
| 9,004,778 B2 | 4/2015 | Isenhour et al. |
| 9,049,500 B2 | 6/2015 | Conner et al. |
| 9,219,546 B2 * | 12/2015 | George ............ H04B 10/25759 |
| 9,547,145 B2 | 1/2017 | Cox et al. |
| 9,602,209 B2 * | 3/2017 | George ............ H04B 10/25759 |
| 9,800,339 B2 * | 10/2017 | George ............ H04B 10/25751 |
| 2001/0001270 A1 | 5/2001 | Williams Vigliaturo |
| 2001/0036351 A1 | 11/2001 | Fritz |
| 2002/0012336 A1 | 1/2002 | Hughes et al. |
| 2002/0012495 A1 | 1/2002 | Sasai et al. |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0128009 A1 | 9/2002 | Boch et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0022645 A1 | 1/2003 | Runzo |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0106435 A1 | 6/2004 | Bauman et al. |
| 2004/0109660 A1 | 6/2004 | Liberty |
| 2004/0123998 A1 | 7/2004 | Berglund et al. |
| 2004/0139477 A1 | 7/2004 | Russell et al. |
| 2004/0141692 A1 | 7/2004 | Anderson et al. |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0196404 A1 | 10/2004 | Loheit et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0058451 A1 | 3/2005 | Ross |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0135753 A1 | 6/2005 | Eigenmann et al. |
| 2005/0152306 A1 | 7/2005 | Bonnassieux et al. |
| 2005/0207711 A1 | 9/2005 | Vo et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0045524 A1 | 3/2006 | Lee et al. |
| 2006/0049941 A1 | 3/2006 | Hunter et al. |
| 2006/0056327 A1 | 3/2006 | Coersmeier |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1 | 6/2006 | Kasai et al. |
| 2006/0133753 A1 | 6/2006 | Nelson et al. |
| 2006/0153515 A1 | 7/2006 | Honma et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0182446 A1 | 8/2006 | Kim et al. |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0223439 A1 | 10/2006 | Pinel et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |

(56) References Cited

U.S. PATENT DOCUMENTS

| | | |
|---|---|---|
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0054682 A1 | 3/2007 | Fanning et al. |
| 2007/0093273 A1 | 4/2007 | Cai |
| 2007/0104447 A1 | 5/2007 | Allen |
| 2007/0114339 A1 | 5/2007 | Winchester |
| 2007/0183732 A1 | 8/2007 | Wittmeier et al. |
| 2007/0189691 A1 | 8/2007 | Barth et al. |
| 2007/0224931 A1 | 9/2007 | Fitton et al. |
| 2007/0261060 A1 | 11/2007 | Manzano et al. |
| 2007/0263962 A1 | 11/2007 | Kohda |
| 2007/0268846 A1 | 11/2007 | Proctor, Jr. et al. |
| 2007/0274718 A1 | 11/2007 | Bridges et al. |
| 2007/0280619 A1 | 12/2007 | Conner et al. |
| 2007/0292143 A1 | 12/2007 | Yu et al. |
| 2008/0002652 A1 | 1/2008 | Gupta et al. |
| 2008/0008437 A1 | 1/2008 | Reagan et al. |
| 2008/0063350 A1 | 3/2008 | Trebesch et al. |
| 2008/0063397 A1 | 3/2008 | Hu et al. |
| 2008/0085094 A1 | 4/2008 | Krampotich |
| 2008/0124038 A1 | 5/2008 | Kowalczyk et al. |
| 2008/0131067 A1 | 6/2008 | Ugolini et al. |
| 2008/0138026 A1 | 6/2008 | Yow et al. |
| 2008/0145008 A1 | 6/2008 | Lewallen et al. |
| 2008/0166094 A1 | 7/2008 | Bookbinder et al. |
| 2008/0193091 A1 | 8/2008 | Herbst |
| 2008/0205844 A1 | 8/2008 | Castonguay et al. |
| 2008/0224869 A1 | 9/2008 | Kaplan |
| 2008/0253723 A1 | 10/2008 | Stokes et al. |
| 2008/0259928 A1 | 10/2008 | Chen et al. |
| 2008/0260389 A1 | 10/2008 | Zheng |
| 2008/0285933 A1 | 11/2008 | Vogel et al. |
| 2008/0292261 A1 | 11/2008 | Kowalczyk et al. |
| 2008/0298743 A1 | 12/2008 | Saravanos et al. |
| 2008/0310464 A1 | 12/2008 | Schneider |
| 2008/0311876 A1 | 12/2008 | Leenaerts et al. |
| 2008/0311944 A1 | 12/2008 | Hansen et al. |
| 2008/0317425 A1 | 12/2008 | Smith et al. |
| 2009/0016723 A1 | 1/2009 | Taniguchi et al. |
| 2009/0022470 A1 | 1/2009 | Krampotich |
| 2009/0034929 A1 | 2/2009 | Reinhardt et al. |
| 2009/0047023 A1* | 2/2009 | Pescod ............ H04B 10/25752 398/115 |
| 2009/0060440 A1 | 3/2009 | Wright et al. |
| 2009/0060441 A1 | 3/2009 | Kowalczyk et al. |
| 2009/0067800 A1 | 3/2009 | Vazquez et al. |
| 2009/0074370 A1 | 3/2009 | Kowalczyk et al. |
| 2009/0074371 A1 | 3/2009 | Bayazit et al. |
| 2009/0081985 A1 | 3/2009 | Rofougaran et al. |
| 2009/0088071 A1 | 4/2009 | Rofougaran |
| 2009/0088072 A1 | 4/2009 | Rofougaran et al. |
| 2009/0097813 A1 | 4/2009 | Hill |
| 2009/0103865 A1 | 4/2009 | Del Rosso |
| 2009/0103878 A1 | 4/2009 | Zimmel |
| 2009/0141780 A1 | 6/2009 | Cruz-Albrecht et al. |
| 2009/0148118 A1 | 6/2009 | Gronvall et al. |
| 2009/0166094 A1 | 7/2009 | Keshavan et al. |
| 2009/0169163 A1 | 7/2009 | Abbott, III et al. |
| 2009/0208210 A1 | 8/2009 | Trojer et al. |
| 2009/0211171 A1 | 8/2009 | Summers |
| 2009/0237317 A1 | 9/2009 | Rofougaran |
| 2009/0245743 A1 | 10/2009 | Cote et al. |
| 2009/0245746 A1 | 10/2009 | Krampotich et al. |
| 2009/0247109 A1 | 10/2009 | Rofougaran |
| 2009/0252462 A1 | 10/2009 | Bonical |
| 2009/0263122 A1 | 10/2009 | Helkey et al. |
| 2009/0274429 A1 | 11/2009 | Krampotich et al. |
| 2009/0278596 A1 | 11/2009 | Rofougaran et al. |
| 2009/0279593 A1 | 11/2009 | Rofougaran et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0040372 A1 | 2/2010 | Gejbrowitz et al. |
| 2010/0054680 A1 | 3/2010 | Lochkovic et al. |
| 2010/0054685 A1 | 3/2010 | Cooke et al. |
| 2010/0061693 A1 | 3/2010 | Bran de Leon et al. |
| 2010/0074587 A1 | 3/2010 | Loeffelholz et al. |
| 2010/0092133 A1 | 4/2010 | Conner |
| 2010/0129030 A1 | 5/2010 | Giraud et al. |
| 2010/0129040 A1 | 5/2010 | Zamzow et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0150556 A1 | 6/2010 | Soto et al. |
| 2010/0150566 A1 | 6/2010 | Soto et al. |
| 2010/0158465 A1 | 6/2010 | Smrha |
| 2010/0158525 A1 | 6/2010 | Walter |
| 2010/0159859 A1 | 6/2010 | Rofougaran |
| 2010/0183274 A1 | 7/2010 | Brunet et al. |
| 2010/0189439 A1 | 7/2010 | Novak et al. |
| 2010/0202745 A1 | 8/2010 | Sokolowski et al. |
| 2010/0209066 A1 | 8/2010 | Anderson et al. |
| 2010/0225520 A1 | 9/2010 | Mohamadi et al. |
| 2010/0239253 A1 | 9/2010 | Lin et al. |
| 2010/0259682 A1 | 10/2010 | Unger |
| 2010/0261501 A1 | 10/2010 | Behzad et al. |
| 2010/0284323 A1 | 11/2010 | Tang et al. |
| 2010/0290753 A1 | 11/2010 | Tang et al. |
| 2010/0303431 A1 | 12/2010 | Cox et al. |
| 2011/0019999 A1 | 1/2011 | George et al. |
| 2011/0026932 A1 | 2/2011 | Yeh et al. |
| 2011/0045767 A1 | 2/2011 | Rofougaran et al. |
| 2011/0052133 A1 | 3/2011 | Simmons et al. |
| 2011/0055875 A1 | 3/2011 | Zussman |
| 2011/0066774 A1 | 3/2011 | Rofougaran |
| 2011/0090942 A1 | 4/2011 | Hardacker et al. |
| 2011/0097052 A1 | 4/2011 | Solheid et al. |
| 2011/0116393 A1 | 5/2011 | Hong et al. |
| 2011/0122912 A1 | 5/2011 | Benjamin et al. |
| 2011/0135307 A1 | 6/2011 | Conner et al. |
| 2011/0139942 A1 | 6/2011 | Moore et al. |
| 2011/0158599 A1 | 6/2011 | Kowalczyk et al. |
| 2011/0206383 A1* | 8/2011 | Chien ............. H04B 10/25759 398/187 |
| 2011/0222616 A1 | 9/2011 | Jiang et al. |
| 2011/0222831 A1 | 9/2011 | Cao et al. |
| 2011/0262095 A1 | 10/2011 | Fabrykowski et al. |
| 2011/0262099 A1 | 10/2011 | Castonguay et al. |
| 2011/0268446 A1 | 11/2011 | Cune et al. |
| 2011/0274433 A1 | 11/2011 | Presi et al. |
| 2012/0093473 A1 | 4/2012 | Cox et al. |
| 2012/0093474 A1 | 4/2012 | Cox et al. |
| 2012/0104145 A1 | 5/2012 | Dagley et al. |
| 2012/0114076 A1 | 5/2012 | Morton et al. |
| 2012/0257893 A1 | 10/2012 | Boyd et al. |
| 2012/0301096 A1 | 11/2012 | Badar et al. |
| 2012/0308190 A1 | 12/2012 | Smith et al. |
| 2012/0309325 A1 | 12/2012 | Carbone et al. |
| 2013/0016952 A1 | 1/2013 | Knuth |
| 2013/0034333 A1 | 2/2013 | Holmberg et al. |
| 2013/0034335 A1 | 2/2013 | Landry et al. |
| 2013/0034336 A1 | 2/2013 | Cassell et al. |
| 2013/0230325 A1 | 9/2013 | Chow et al. |
| 2013/0295980 A1 | 11/2013 | Reuven et al. |
| 2014/0099064 A1 | 4/2014 | Fabrykowski et al. |
| 2014/0119705 A1 | 5/2014 | Fabrykowski et al. |
| 2014/0153891 A1 | 6/2014 | Ciechomski et al. |
| 2014/0233951 A1 | 8/2014 | Cook |
| 2014/0286643 A1 | 9/2014 | George et al. |
| 2015/0125146 A1 | 5/2015 | Erreygers et al. |
| 2016/0080085 A1 | 3/2016 | George et al. |

FOREIGN PATENT DOCUMENTS

| | | |
|---|---|---|
| DE | 4133375 C1 | 4/1993 |
| DE | 4240727 C1 | 2/1994 |
| DE | 29800194 U1 | 3/1998 |
| DE | 10005294 A1 | 8/2001 |
| DE | 10238189 A1 | 2/2004 |
| DE | 202004011493 U1 | 9/2004 |
| DE | 20320702 U1 | 10/2005 |

(56) References Cited

FOREIGN PATENT DOCUMENTS

| | | |
|---|---|---|
| DE | 202005018884 U1 | 2/2006 |
| DE | 202007000556 U1 | 10/2007 |
| DE | 202007012420 U1 | 10/2007 |
| DE | 202010009385 U1 | 9/2010 |
| EP | 0409390 A2 | 1/1991 |
| EP | 0410622 A2 | 1/1991 |
| EP | 0415647 A2 | 3/1991 |
| EP | 0490644 A1 | 6/1992 |
| EP | 0541820 A1 | 5/1993 |
| EP | 0593927 A1 | 4/1994 |
| EP | 0720322 A2 | 7/1996 |
| EP | 0725468 A1 | 8/1996 |
| EP | 0828356 A2 | 3/1998 |
| EP | 0840153 A2 | 5/1998 |
| EP | 0928053 A2 | 7/1999 |
| EP | 1107031 A1 | 6/2001 |
| EP | 1120674 A1 | 8/2001 |
| EP | 1179745 A2 | 2/2002 |
| EP | 1203974 A2 | 5/2002 |
| EP | 1316829 A2 | 6/2003 |
| EP | 1944635 A2 | 7/2008 |
| EP | 1944886 A1 | 7/2008 |
| EP | 2060942 A2 | 5/2009 |
| EP | 2141527 A2 | 1/2010 |
| EP | 2159618 A1 | 3/2010 |
| EP | 2180614 A1 | 4/2010 |
| FR | 2123728 A5 | 9/1972 |
| FR | 2748576 A1 | 11/1997 |
| GB | 2254163 A | 9/1992 |
| JP | 59107317 A | 6/1984 |
| JP | 6227312 A | 8/1994 |
| JP | 11125722 A | 5/1999 |
| JP | 11231163 A | 8/1999 |
| JP | 2001116968 A | 4/2001 |
| JP | 2002026953 A | 1/2002 |
| JP | 2004061713 A | 2/2004 |
| JP | 2009010595 | 1/2009 |
| WO | 8805925 A1 | 8/1988 |
| WO | 8905989 A1 | 6/1989 |
| WO | 9507484 A1 | 3/1995 |
| WO | 9630791 A1 | 10/1996 |
| WO | 9638752 A1 | 12/1996 |
| WO | 9722025 A1 | 6/1997 |
| WO | 9725642 A1 | 7/1997 |
| WO | 9729608 A1 | 8/1997 |
| WO | 9736197 A1 | 10/1997 |
| WO | 0221186 A1 | 3/2002 |
| WO | 02099528 A1 | 12/2002 |
| WO | 03009527 A2 | 1/2003 |
| WO | 03093889 A1 | 11/2003 |
| WO | 2004086112 A1 | 10/2004 |
| WO | 2005020400 A1 | 3/2005 |
| WO | 2005050277 A2 | 6/2005 |
| WO | 2005088373 A1 | 9/2005 |
| WO | 2005091036 A1 | 9/2005 |
| WO | 2006050505 A1 | 5/2006 |
| WO | 2006127457 A1 | 11/2006 |
| WO | 2006135524 A3 | 12/2006 |
| WO | 2007050515 A1 | 5/2007 |
| WO | 2007089682 A2 | 8/2007 |
| WO | 2007129953 A1 | 11/2007 |
| WO | 2008033997 A1 | 3/2008 |
| WO | 2008048935 A2 | 4/2008 |
| WO | 2008125217 A1 | 10/2008 |
| WO | 2008137894 A1 | 11/2008 |
| WO | 2008148107 A1 | 12/2008 |
| WO | 2009029485 A1 | 3/2009 |

OTHER PUBLICATIONS

Final Office Action for U.S. Appl. No. 12/417,250 dated Mar. 3, 2011, 9 pages.
Non-final Office Action for U.S. Appl. No. 12/417,250 dated Jul. 27, 2010, 11 pages.
Advisory Action for U.S. Appl. No. 12/697,628 dated Mar. 1, 2012, 3 pages.
Final Office Action for U.S. Appl. No. 12/697,628 dated Nov. 17, 2011, 15 pages.
Non-final Office Action for U.S. Appl. No. 12/697,628 dated Apr. 6, 2011, 11 pages.
Final Office Action for U.S. Appl. No. 12/630,938 dated Jun. 1, 2012, 18 pages.
Non-final Office Action for U.S. Appl. No. 12/630,938 dated Dec. 19, 2011, 15 pages.
Quayle Action for U.S. Appl. No. 12/861,345 dated Apr. 9, 2012, 6 pages.
Non-final Office Action for U.S. Appl. No. 12/861,345 dated Dec. 15, 2011, 10 pages.
Non-final Office Action for U.S. Appl. No. 12/700,837 dated Jan. 30, 2012, 7 pages.
Final Office Action for U.S. Appl. No. 12/474,866 dated Jan. 31, 2012, 8 pages.
Non-final Office Action for U.S. Appl. No. 12/474,866 dated Aug. 5, 2011, 9 pages.
International Search Report for PCT/US2009/066779, dated Aug. 27, 2010, 3 pages.
International Search Report for PCT/EP2009/000929, dated Apr. 27, 2009, 4 pages.
Final Office Action for U.S. Appl. No. 12/700,837 dated Aug. 31, 2012, 10 pages.
International Search Report for PCT/US2007/023631, dated Apr. 21, 2008, 2 pages.
International Search Report for PCT/US2008/000095 dated Sep. 12, 2008, 5 pages.
International Search Report for PCT/US2008/002514 dated Aug. 8, 2008, 2 pages.
International Search Report for PCT/US2008/006798 dated Oct. 1, 2008, 2 pages.
Advisory Action for U.S. Appl. No. 12/072,187 dated Aug. 15, 2011, 2 pages.
Final Office Action for U.S. Appl. No. 12/072,187 dated Jun. 13, 2011, 21 pages.
Non-final Office Action for U.S. Appl. No. 12/072,187 dated Nov. 30, 2010, 17 pages.
Non-final Office Action for U.S. Appl. No. 12/892,280 dated Nov. 6, 2012, 4 pages.
Non-final Office Action for U.S. Appl. No. 13/083,110 dated Dec. 12, 2012, 9 pages.
International Search Report for PCT/US2009/057140 dated Nov. 9, 2009, 2 pages.
Examiner's Answer to Appeal Brief for U.S. Appl. No. 12/323,385 dated Feb. 21, 2013, 11 pages.
Final Office Action for U.S. Appl. No. 12/625,341 dated Feb. 12, 2013, 10 pages.
Advisory Action for U.S. Appl. No. 12/625,341 dated Apr. 25, 2013, 6 pages.
Non-final Office Action for U.S. Appl. No. 12/625,341 dated Oct. 16, 2012, 8 pages.
Non-final Office Action for U.S. Appl. No. 12/323,385 dated Sep. 21, 2011, 10 pages.
Final Office Action for U.S. Appl. No. 12/323,385 dated Mar. 6, 2012, 12 pages.
Final Office Action for U.S. Appl. No. 12/751,860 dated Nov. 5, 2012, 6 pages.
Non-final Office Action for U.S. Appl. No. 12/751,860 dated Jul. 18, 2012, 8 pages.
Final Office Action for U.S. Appl. No. 13/275,798 dated Jun. 27, 2013, 10 pages.
Non-final Office Action for U.S. Appl. No. 13/275,798 dated Mar. 1, 2013, 8 pages.
Final Office Action for U.S. Appl. No. 13/177,233 dated Mar. 29, 2013, 9 pages.
Advisory Action for U.S. Appl. No. 13/177,233 dated Jul. 17, 2013, 3 pages.
Non-final Office Action for U.S. Appl. No. 13/177,233 dated Dec. 17, 2012, 7 pages.

(56) References Cited

OTHER PUBLICATIONS

Non-final Office Action for U.S. Appl. No. 10/804,958 dated Jul. 22, 2009, 8 pages.
Final Office Action for U.S. Appl. No. 10/804,958 dated Jun. 11, 2008, 9 pages.
Non-final Office Action for U.S. Appl. No. 10/804,958 dated Aug. 30, 2013, 11 pages.
Notice of Allowance for U.S. Appl. No. 10/804,958 dated May 24, 2013, 8 pages.
Decision on Appeal for U.S. Appl. No. 10/804,958 dated Apr. 18, 2013, 9 pages.
Examiner's Answer to Appeal Brief for U.S. Appl. No. 10/804,958 dated Apr. 29, 2010, 12 pages.
Final Office Action for U.S. Appl. No. 10/804,958 dated Oct. 9, 2007, 8 pages.
Non-final Office Action for U.S. Appl. No. 10/804,958 dated Jun. 15, 2007, 7 pages.
Final Office Action for U.S. Appl. No. 10/804,958 dated Nov. 3, 2006, 7 pages.
Non-final Office Action for U.S. Appl. No. 10/804,958 dated Apr. 6, 2006, 7 pages.
Non-final Office Action for U.S. Appl. No. 10/804,958 dated Sep. 21, 2005, 7 pages.
Notice of Allowance for U.S. Appl. No. 11/595,723 dated Dec. 28, 2010, 8 pages.
Non-final Office Action for U.S. Appl. No. 11/595,723 dated Jun. 21, 2010, 9 pages.
Non-final Office Action for U.S. Appl. No. 11/595,723 dated Jan. 5, 2010 9 pages.
Advisory Action for U.S. Appl. No. 11/595,723 dated Nov. 24, 2009, 3 pages.
Final Office Action for U.S. Appl. No. 11/595,723 dated Jul. 8, 2009, 13 pages.
Non-final Office Action for U.S. Appl. No. 11/595,723 dated Sep. 25, 2008, 13 pages.
Final Office Action for U.S. Appl. No. 11/595,723 dated Apr. 11, 2008, 12 pages.
Non-final Office Action for U.S. Appl. No. 11/595,723 dated Jun. 7, 2007 18 pages.
Examiner's Answer to Appeal Brief for U.S. Appl. No. 11/975,440 dated Oct. 22, 2010, 17 pages.
Final Office Action for U.S. Appl. No. 11/975,440 dated Mar. 8, 2010, 10 pages.
Non-final Office Action for U.S. Appl. No. 11/975,440 dated Oct. 28, 2009, 7 pages.
Non-final Office Action for U.S. Appl. No. 11/975,440 dated Jul. 10, 2009, 6 pages.
Notice of Allowance for U.S. Appl. No. 12/566,191 dated May 24, 2011, 5 pages.
Final Office Action for U.S. Appl. No. 12/566,191 dated Feb. 15, 2011, 8 pages.
Non-Final Office Action for U.S. Appl. No. 12/566,191 dated Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 dated Jul. 1, 2010, 7 pages.
Advisory Action for U.S. Appl. No. 11/499,572 dated Jan. 27, 2010, 3 pages.
Final Office Action for U.S. Appl. No. 11/499,572 dated Aug. 12, 2009, 9 pages.
Advisory Action for U.S. Appl. No. 11/499,572 dated May 29, 2009, 3 pages.
Final Office Action for U.S. Appl. No. 11/499,572 dated Dec. 26, 2008, 8 pages.
Non-final Office Action for U.S. Appl. No. 11/499,572 dated Jun. 13, 2008, 7 pages.
Notice of Allowance for U.S. Appl. No. 12/012,144 dated Feb. 10, 2009, 6 pages.
Non-final Office Action for U.S. Appl. No. 12/012,144 dated Jul. 15, 2008, 5 pages.
Notice of Allowance for U.S. Appl. No. 11/712,168 dated Apr. 21, 2010, 9 pages.
Notice of Allowance for U.S. Appl. No. 11/712,168 dated Sep. 18, 2009, 9 pages.
Notice of Allowance for U.S. Appl. No. 11/712,168 dated Jun. 1, 2009, 7 pages.
Notice of Allowance for U.S. Appl. No. 11/712,168 dated Apr. 7, 2009, 9 pages.
Advisory Action for U.S. Appl. No. 11/712,168 dated Oct. 20, 2008, 3 pages.
Final Office Action for U.S. Appl. No. 11/712,168 dated Jul. 24, 2008, 11 pages.
Non-final Office Action for U.S. Appl. No. 11/712,168 dated Oct. 9, 2007, 7 pages.
Advisory Action for U.S. Appl. No. 11/809,390 dated Dec. 14, 2009, 2 pages.
Final Office Action for U.S. Appl. No. 11/809,390 dated Sep. 25, 2009, 12 pages.
Non-final Office Action for U.S. Appl. No. 11/809,390 dated Mar. 11, 2009, 9 pages.
Notice of Allowance for U.S. Appl. No. 11/809,390 dated Nov. 18, 2008, 7 pages.
Non-final Office Action for U.S. Appl. No. 11/809,390 dated Jul. 25, 2008, 10 pages.
Non-final Office Action for U.S. Appl. No. 11/439,070 dated Jun. 17, 2009, 9 pages.
Non-final Office Action for U.S. Appl. No. 11/439,070 dated Oct. 17, 2008, 13 pages.
Non-final Office Action for U.S. Appl. No. 11/439,070 dated Jan. 11, 2008, 11 pages.
Non-final Office Action for U.S. Appl. No. 11/439,070 dated May 16, 2007, 16 pages.
Final Office Action for U.S. Appl. No. 12/229,810 dated Jun. 9, 2011, 16 pages.
Non-final Office Action for U.S. Appl. No. 12/229,810 dated Dec. 23, 2010, 16 pages.
Final Office Action for U.S. Appl. No. 13/083,110 dated Aug. 5, 2013, 13 pages.
Notice of Allowance for U.S. Appl. No. 12/417,250 dated Nov. 9, 2011, 8 pages.
Decision on Appeal for U.S. Appl. No. 11/975,440 dated Nov. 4, 2013, 10 pages.
Advisory Action for U.S. Appl. No. 13/083,110 dated Nov. 12, 2013, 3 pages.
Advisory Action for U.S. Appl. No. 13/275,798 dated Sep. 12, 2013, 2 pages.
Non-final Office Action for U.S. Appl. No. 13/601,245 dated Mar. 27, 2014, 8 pages.
Non-Final Office Action for U.S. Appl. No. 13/648,811 dated Oct. 24, 2014, 10 pages.
Patent Examination Report No. 1 for Australian Patent Application No. 2011317244, dated Jul. 28, 2014, 3 pages.
Patent Examination Report No. 1 for Australian Patent Application No. 2015207830, dated Jun. 8, 2016, 3 pages.
International Search Report and Written Opinion for PCT/US2011/064428 dated Sep. 11, 2012, 8 pages.
Chien, Hung-Chang, et al., "60GHz millimeter-wave gigabit wireless services over long-reach passive optical network using remote signal regeneration and upconversion," Optics Express, vol. 17, Issue 5, Mar. 2009, 6 pages.
Chowdhury, Arshad, et al., "Advanced System Technologies and Field Demonstration for In-Building Optical-Wireless Network with Integrated Broadband Services," Journal of Lightwave Technology, vol. 27, Issue 12, Jun. 15, 2009, IEEE, pp. 1920-1927.
Chung, Hwan, et al., "Transmission of Multiple HD-TV Signals over Wireless/Wireline Millimeter Wave Link," Conference on Optical Internet, Jul. 2006, Jeju, Korea, OSIA, pp. 94-96.
Huchard, Mathieu, et al., "Ultra-Broadband Wireless Home Network Based on 60-GHz WPAN Cells Interconnected via RoF," Journal of Lightwave Technology, vol. 26, Issue 15, Aug. 2008, IEEE, pp. 2364-2372.

(56) References Cited

OTHER PUBLICATIONS

Ng'oma, Anthony, et al., "Radio-over-Fiber Technologies for High Data Rate Wireless Applications," 32nd International Conference on SARNOFF, Mar. 2009, IEEE, 6 pages.
Sauer, Michael, et al., "Radio Over Fiber for Picocellular Network Architectures," Journal of Lightwave Technology, vol. 25, Issue 11, Nov. 2007, IEEE, pp. 3301-3320.
Examination Report for European Patent Application No. 11805320.6, dated Dec. 14, 2017, 4 pages.
Non-Final Office Action for U.S. Appl. No. 15/440,646, dated Mar. 24, 2017, 14 pages.
Non-final Office Action for U.S. Appl. No. 13/479,846 dated Sep. 13, 2013, 11 pages.
Non-final Office Action for U.S. Appl. No. 13/613,759 dated Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 dated Dec. 26, 2013, 25 pages.
Final Office Action for U.S. Appl. No. 10/804,958 dated Mar. 11, 2014, 13 pages.
Notice of Allowance for U.S. Appl. No. 11/975,440 dated Jan. 15, 2014, 7 pages.
Non-final Office Action for U.S. Appl. No. 13/087,765 dated Sep. 18, 2013, 8 pages.
Final Office Action for U.S. Appl. No. 13/479,846 dated Feb. 14, 2014, 11 pages.
Final Office Action for U.S. Appl. No. 13/613,759 dated Jan. 27, 2014, 13 pages.
Non-final Office Action for U.S. Appl. No. 13/083,110 dated Mar. 18, 2014, 14 pages.
International Search Report for PCT/US2011/030466 dated Aug. 5, 2011, 4 pages.
Non-final Office Action for U.S. Appl. No. 13/094,572 dated Jan. 18, 2013, 17 pages.
Final Office Action for U.S. Appl. No. 13/094,572 dated Jul. 8, 2013, 13 pages.
Advisory Action for U.S. Appl. No. 13/094,572 dated Oct. 7, 2013, 2 pages.
Non-final Office Action for U.S. Appl. No. 13/094,572 dated Mar. 4, 2014, 14 pages.
Advisory Action for U.S. Appl. No. 13/613,759 dated Apr. 7, 2014, 3 pages.
Non-final Office Action for U.S. Appl. No. 13/649,377 dated Jan. 31, 2014, 5 pages.
International Search Report for PCT/US2011/030446 dated Jul. 14, 2011, 3 pages.
International Search Report for PCT/US2011/030448 dated Jul. 20, 2011, 5 pages.
Advisory Action for U.S. Appl. No. 10/804,958 dated Jun. 26, 2014, 4 pages.
Notice of Allowance for U.S. Appl. No. 11/975,440 dated Apr. 30, 2014, 8 pages.
Final Office Action for U.S. Appl. No. 12/072,187 dated May 27, 2014, 27 pages.
Non-final Office Action for U.S. Appl. No. 13/089,692 dated Jan. 13, 2014, 8 pages.
Non-final Office Action for U.S. Appl. No. 13/089,692 dated May 5, 2014, 7 pages.
Final Office Action for U.S. Appl. No. 13/089,692 dated Aug. 13, 2014, 8 pages.
Advisory Action for U.S. Appl. No. 13/089,692 dated Oct. 22, 2014, 2 pages.
Notice of Allowance and Interview Summary for U.S. Appl. No. 13/094,572 dated Aug. 7, 2014, 11 pages.
Examiner's Answer to the Appeal Brief for U.S. Appl. No. 13/275,798 dated Aug. 26, 2014, 6 pages.
Advisory Action for U.S. Appl. No. 13/479,846 dated May 8, 2014, 3 pages.
Non-final Office Action for U.S. Appl. No. 13/537,753 dated Mar. 27, 2014, 7 pages.
Notice of Allowance for U.S. Appl. No. 13/537,753 dated Aug. 21, 2014, 7 pages.
Examiner's Answer to the Appeal Brief for U.S. Appl. No. 13/613,759 dated Aug. 18, 2014, 6 pages.
Final Office Action for U.S. Appl. No. 13/649,377 dated May 29, 2014, 8 pages.
Non-final Office Action for U.S. Appl. No. 14/093,636 dated Oct. 10, 2014, 6 pages.
Non-final Office Action for U.S. Appl. No. 13/275,842 dated Nov. 13, 2013, 7 pages.
Final Office Action for U.S. Appl. No. 13/275,842 dated Aug. 28, 2014, 20 pages.
Examiner's Answer to the Appeal Brief for U.S. Appl. No. 12/072,187 dated Dec. 19, 2014, 25 pages.
Final Office Action for U.S. Appl. No. 13/083,110 dated Nov. 7, 2014, 20 pages.
Non-Final Office Action for U.S. Appl. No. 13/362,474 dated Dec. 5, 2014, 8 pages.
Non-Final Office Action for U.S. Appl. No. 13/089,692 dated Dec. 2, 2014, 7 pages.
Notice of Allowance for U.S. Appl. No. 13/537,753 dated Dec. 12, 2014, 7 pages.
Advisory Action for U.S. Appl. No. 13/275,842 dated Nov. 20, 2014, 3 pages.
Examiner's Answer to the Appeal Brief for U.S. Appl. No. 10/804,958 dated Mar. 6, 2015, 8 pages.
Decision on Appeal for U.S. Appl. No. 12/323,385 dated Apr. 1, 2015, 6 pages.
Advisory Action for U.S. Appl. No. 13/083,110 dated Jan. 30, 2015, 3 pages.
Non-final Office Action for U.S. Appl. No. 13/083,110 dated Mar. 4, 2015, 17 pages.
Final Office Action for U.S. Appl. No. 13/089,692 dated Mar. 12, 2015, 7 pages.
Non-final Office Action for U.S. Appl. No. 13/410,936 dated Jan. 26, 2015, 13 pages.
Non-final Office Action for U.S. Appl. No. 13/479,846 dated Mar. 19, 2015, 14 pages.
International Search Report for PCT/US2013/028493 dated Jun. 24, 2013, 9 pages.
International Preliminary Report on Patentability for PCT/US2013/028493 dated Sep. 12, 2014, 7 pages.
International Preliminary Report on Patentability for PCT/US2013/038843 dated Nov. 13, 2014, 10 pages.
Lin, Yu-Min et al., "Next-Generation OFDMA-Based Passive Optical Network Architecture Supporting Radio-Over-Fiber," IEEE Journal on Selected Areas in Communications, vol. 28, No. 6, Aug. 2010, IEEE, pp. 791-799.
Koonen, T., "Fiber to the Home/Fiber to the Premises: What, Where, and When?" Proceedings of the IEEE, vol. 94, No. 5, May 2006, IEEE, pp. 911-934.
Author Unknown, "Wireless bridge takes high-speed communications to 'last mile'," Sifi International News, Feb. 28, 2012, Sify Technologies Ltd., 4 pages.
Yoshie, T. et al., "Advanced Wireless IP Access System (WIPAS) for Fixed Wireless Access (FWA)—Broadband Access System for triple play services by 'Fiber + Radio'," Proceedings of the 19th Annual IEEE International Symposium on Personal, Indoor, and Mobile Radio Communications, Sep. 15-18, 2008, Cannes, France, IEEE, 5 pages.
Kimura, Y. et al., "A Low-Cost and Very Compact Wireless Terminal Integrated on the Back of a Waveguide Planar Array for 26 GHz Band Fixed Wireless Access (FWA) Systems," IEEE Transactions on Antennas and Propagation, vol. 53, No. 8, Aug. 2005, pp. 2456-2463.
Webb, W., "Broadband Fixed Wireless Access as a Key Component of the Future Integrated Communications Environment," IEEE Communications Magazine, vol. 39, No. 9, Sep. 2001, IEEE, pp. 115-121.
Chien et al., "Optical Millimeter-Wave Generation and Transmission Without Carrier Suppression for Single and Multi-Band Wire-

(56) References Cited

OTHER PUBLICATIONS less Over Fiber Applications," Journal of Lightwave Technology, vol. 28, No. 16, Aug. 15, 2010, pp. 2230-2237.
Mohamed et al., "Millimeter-Wave Carrier Generation System for Radio over Fiber," International Symposium on High Capacity Optical Networks and Enabling Technologies, Nov. 18-20, 2008, Penang, Malaysia, IEEE, pp. 111-115.
Parker et al., "Radio-over-fiber technologies arising from the Building the future Optical Network in Europe (BONE) project," www.ietdl.org, IET Optoelectronics, 2010, vol. 4, Issue 6, pp. 247-259.
Rappaport et al., "State of the Art in 60-GHz Integrated Circuits and Systems for Wireless Communications," Proceedings of the IEEE, vol. 99, No. 8, Aug. 2011, pp. 1390-1436.
Singh et al., "Distributed coordination with deaf neighbors: efficient medium access for 60 GHz mesh networks," IEEE INFOCOM 2010 proceedings, 9 pages.
Notice of Allowance for U.S. Appl. No. 12/323,385 dated Jul. 24, 2015, 8 pages.
Notice of Allowance for U.S. Appl. No. 13/083,110 dated Nov. 25, 2015, 10 pages.
Non-final Office Action for U.S. Appl. No. 13/089,692 dated Jan. 14, 2016, 8 pages.
Final Office Action for U.S. Appl. No. 13/410,936 dated Jul. 22, 2015, 19 pages.
Advisory Action for U.S. Appl. No. 13/410,936 dated Sep. 17, 2015, 3 pages.
Final Office Action for U.S. Appl. No. 13/479,846 dated Jan. 4, 2016, 15 pages.
Final Office Action for U.S. Appl. No. 14/093,636 dated May 22, 2015, 9 pages.
Non-final Office Action for U.S. Appl. No. 14/300,541 dated May 6, 2015, 8 pages.
Notice of Allowance and Applicant-Initiated Interview Summary for U.S. Appl. No. 14/300,541 dated Aug. 28, 2015, 10 pages.
Non-final Office Action for U.S. Appl. No. 13/275,842 dated Apr. 28, 2015, 21 pages.
Final Office Action for U.S. Appl. No. 13/275,842 dated Nov. 13, 2015, 24 pages.
Final Office Action for U.S. Appl. No. 13/648,811 dated Jun. 9, 2015, 19 pages.
Non-final Office Action for U.S. Appl. No. 14/947,187 dated Feb. 2, 2016, 12 pages.
Non-final Office Action for U.S. Appl. No. 13/873,927 dated Aug. 14, 2015, 19 pages.
Final Office Action for U.S. Appl. No. 13/873,927 dated Feb. 8, 2016, 24 pages.
European Search Report for European Patent Application No. 08877225.6 dated Jan. 5, 2015, 5 pages.
Examination Report for European Patent Application No. 13726908.0, dated Sep. 9, 2015, 6 pages.
Third Office Action for Chinese Patent Application No. 200880131932.2 dated Jun. 10, 2014, 17 pages.
International Search Report for PCT/US2013/038843 dated Jul. 18, 2013, 4 pages.
Author Unknown, "DECT: The standard explained," DECT Forum, Feb. 1997, Solothum, Switzerland, 16 pages.
Tekmar Sistemi s.r.l., "Definition of Wideband Distribution Systems," R4-020721, TSG-RAN Working Group 4 (Radio), meeting #23, Gyeongju, Korea, May 13-17, 2002, 12 pages.
Decision on Appeal for U.S. Appl. No. 10/804,958, dated Oct. 18, 2016, 8 pages.
Decision on Appeal for U.S. Appl. No. 12/072,187, dated Nov. 28, 2016, 10 pages.
Notice of Allowance for U.S. Appl. No. 13/275,798, dated Sep. 16, 2016, 7 pages.
Non-Final Office Action for U.S. Appl. No. 13/275,798, dated Nov. 29, 2016, 10 pages.
Notice of Allowance for U.S. Appl. No. 13/275,798, dated Apr. 3, 2017.
Non-final Office Action for U.S. Appl. No. 13/410,936 dated Feb. 25, 2016, 25 pages.
Final Office Action for U.S. Appl. No. 13/410,936 dated Aug. 24, 2016, 24 pages.
Decision on Appeal for U.S. Appl. No. 13/613,759 dated Jun. 30, 2016, 13 pages.
Notice of Allowance for U.S. Appl. No. 13/613,759, dated Sep. 16, 2016, 8 pages.
Non-final Office Action for U.S. Appl. No. 13/275,842 dated Jun. 7, 2016, 11 pages.
Notice of Allowance for U.S. Appl. No. 13/275,842, dated Sep. 23, 2016, 9 pages.
Final Office Action for U.S. Appl. No. 14/947,187 dated Aug. 5, 2016, 9 pages.
Notice of Allowance for U.S. Appl. No. 13/873,927, dated Nov. 4, 2016, 8 pages.
Advisory Action for U.S. Appl. No. 13/873,927 dated Apr. 14, 2016, 3 pages.
Non-final Office Action for U.S. Appl. No. 13/873,927 dated May 12, 2016, 23 pages.
Chien et al. "Optical Millimeter-wave Generation and Transmission Without Carrier Suppression over Fiber Applications" Journal of Lightwave Technology, vol. 28 No. 16 (2010) p. 2230-2237.
Chien, A. Chowdhury, et. al., 60GHz millimeter-wave gigabit wireless services over long reach passive optical network using remote signal regeneration and up conversion, Optics Express, Mar. 2009.
Chowdhury, H. Chien, et. al., Advance System Technologies and Field Demonstration for In-Building Optical-Wireless Network with Integrated Broadband Services, Journal of Lightwave Technology, Jun. 15, 2009.
Chung, S. H. Chang, et. al., Transmission of Multiple HD-TV Signals over Wireless/Wireline Millimeter Wave Link, Conference on Optical Internet 2006.
Huchard, M. Weiss, et. al., Ultra-Broadband Wireless Home Network Based on 60GHz WPAN Cells Interconnected via RoF, Journal of Lightwave Technology, Aug. 2008.
International Search Report and Written Opinion PCT/US2011/064428 dated Sep. 11, 2012.
Mohamed et al. "Millimeter-wave Carrier Generatin System for Radio over Fiber" High Capactiy Optical Networks and Enabling Technologies (2008) p. 111/115 XP031446262.
Ng'oma, and M. Sauer, Radio-over-Fiber Technologies for High Data Rate Wireless Applications, SANRNOF, 2009.
Parker et al. "Radio-over-fibre technologies arising from the building the future optical network in europe (BONE) project", IET Optoelectron., 2010, vol. 4, Iss. 6, pp. 247-259.
Rapport et al. "State of the Art in 60-GHz Integrated Circuits and Systems for Wireless Communications" Proceedings of the IEEE vol. 99, No. 8, Aug. 2011.
Sauer, A. Kobyakov, and J. George, "Radio over Fiber for picocellular network architectures", JLT, vol. 25, No. 11, pp. 3301-3320, 2007.
Singh et al. "Distributed coordination with deaf neighbors: efficient medium access for 60 GHz mesh networks" IEEE INFOCOM 2010 proceedings, 9 pgs.

\* cited by examiner

EXTREMELY HIGH FREQUENCY (EHF) DISTRIBUTED ANTENNA SYSTEMS, AND RELATED COMPONENTS AND METHODS

RELATED APPLICATIONS

This application is a continuation of U.S. application Ser. No. 15/440,646 filed on Feb. 23, 2017, which is a continuation of U.S. application Ser. No. 14/947,187, filed Nov. 20, 2015, which is a continuation of U.S. application Ser. No. 14/300,541, filed Jun. 10, 2014, which is a continuation of and claims the benefit of priority under 35 U. S. C. § 365 of International Patent Application No. PCT/US11/64428, filed on Dec. 12, 2011, the contents of all applications being hereby incorporated herein by reference in their entireties.

BACKGROUND

Field of the Disclosure

The technology of the present disclosure relates to distribution of radio-frequency (RF) communications signals in distributed antenna system.

Technical Background

Wireless customers are demanding digital data services such as streaming video signals. Concurrently, some wireless customers use their wireless devices in areas that are poorly served by conventional cellular networks such as inside certain buildings or areas where there is little cellular coverage. One response to the intersection of these two concerns has been the use of distributed antenna systems, which are especially effective at providing wireless digital data services within a building. Such distributed antenna systems may use Wireless Fidelity (WiFi) or wireless local area networks (WLANs) to help provide digital data services.

However, WiFi and WLAN-based technology may not be able to provide sufficient bandwidth for expected demand, especially as high definition (HD) video becomes more prevalent. As an example, people want to upload or download HD video on their mobile devices and current standards do not allow this without substantial degradation to the quality of the video.

SUMMARY OF THE DETAILED DESCRIPTION

Embodiments disclosed in the detailed description include extremely high frequency (EHF) (i.e., 30-300 GHz), distributed antenna systems, and related components, and methods. The systems disclosed herein can support provision of digital data services to wireless clients. The use of the EHF band allows for the use of channels having a higher bandwidth, which in turn allows more data intensive signals to be communicated without substantial degradation to the quality of the video. As a non-limiting example, the distributed antenna systems disclosed herein may operate at an EHF of approximately 60 GHz with approximately 7 GHz bandwidth channels to provide greater bandwidth to digital data services. The distributed antenna systems disclosed herein may be well suited to be deployed in an indoor building or other facility for delivering of digital data services.

In this regard, in one embodiment, a base unit for distributing EHF modulated data signals to at least one remote antenna unit (RAU) is disclosed. The base unit comprises a downlink data source input configured to receive a downlink electrical data signal from a data source. The base unit further comprises an electrical-to-optical (E-O) converter configured to convert the downlink electrical data signal into a downlink optical data signal. The base unit further comprises an oscillator configured to generate an electrical carrier signal at a center frequency in the EHF band. The base unit further comprises a modulator. The modulator is configured to combine the downlink optical data signal with the electrical carrier signal to form a downlink modulated optical signal comprising the downlink optical data signal modulated at the center frequency of the electrical carrier signal. The modulator is further configured to send the downlink modulated optical signal to at least one RAU.

In another embodiment, a method for distributing EHF modulated data signals to at least one RAU is provided. The method comprises receiving a downlink electrical data signal from a downlink data source. The method further comprises converting the downlink electrical data signal into a downlink optical data signal. The method further comprises combining the downlink optical data signal with an electrical carrier signal operating in the EHF band to form a downlink modulated optical signal comprising the downlink optical data signal modulated at the center frequency of the electrical carrier signal. The method further comprises sending the downlink modulated optical signal to the at least one RAU.

In another embodiment, a system for distributing EHF modulated data signals to at least one RAU is provided. The system comprises a downlink data source input configured to receive a downlink electrical data signal from a data source. The system further comprises an E-O converter configured to convert the downlink electrical data signal into a downlink optical data signal. The system further comprises an oscillator configured to generate an electrical carrier signal at a center frequency in the EHF band. The system further comprises a modulator. The modulator is configured to combine the downlink optical data signal with the electrical carrier signal to form a downlink modulated optical signal comprising the downlink optical data signal modulated at the center frequency of the electrical carrier signal. The system further comprises at least one RAU comprising an antenna. The at least one RAU is configured to receive the downlink modulated optical signal from the modulator, convert the downlink modulated optical signal to a downlink modulated electromagnetic signal, and transmit the downlink modulated electromagnetic signal to a wireless client.

In another embodiment, a base unit for distributing EHF modulated data signals to at least one RAU is provided. The base unit comprises a downlink digital data source input configured to receive a downlink electrical digital data signal from a data source. The base unit further comprises an E-O converter configured to convert the downlink electrical digital data signal into a downlink optical digital data signal, wherein the E-O converter comprises a laser diode. The base unit further comprises a local oscillator configured to generate an electrical carrier signal at a center frequency at approximately sixty (60) GigaHertz (GHz). The base unit further comprises a modulator. The modulator is configured to combine the downlink optical digital data signal with the electrical carrier signal to form a downlink modulated optical signal comprising the downlink optical digital data signal modulated at the center frequency of the electrical carrier signal, the modulator further configured to send the downlink modulated optical signal to at least one RAU.

Non-limiting examples of digital data services include, but are not limited to Ethernet, WLAN, Worldwide Interoperability for Microwave Access (WiMax), Wireless Fidelity (WiFi), Digital Subscriber Line (DSL), Long Term Evolution (LTE), and high definition television signals, etc. Further, as a non-limiting example, the distributed antenna system may be an optical fiber-based distributed antenna system, but such is not required. The embodiments disclosed herein are also applicable to other remote antenna clusters and distributed antenna systems, including those that include other forms of communications media for distribution of communications signals, including electrical conductors and wireless transmission. The embodiments disclosed herein may also be applicable to remote antenna clusters and distributed antenna systems and may also include more than one communications media for distribution of communications signals (e.g., digital data services, RF communications services).

Additional features and advantages will be set forth in the detailed description which follows, and in part, will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather these embodiments are provided so that this disclosure will satisfy applicable legal requirements. Whenever possible, like reference numbers will be used to refer to like components or parts.

Embodiments disclosed in the detailed description include extremely high frequency (EHF) (i.e., 30-300 GHz) distributed antenna systems, and related components, and methods. The systems disclosed herein can support provision of digital data services to wireless clients. The use of the EHF band allows for the use of channels having a higher bandwidth, which in turn allows more data intensive signals, such as uncompressed high definition (HD) video to be communicated without substantial degradation to the quality of the video. As a non-limiting example, the distributed antenna systems disclosed herein may operate at approximately sixty (60) GHz with approximately seven (7) GHz bandwidth channels to provide greater bandwidth to digital data services. The distributed antenna systems disclosed herein may be well suited to be deployed in an indoor building or other facility for delivering of digital data services.

In this regard, in one embodiment, a base unit for distributing EHF modulated data signals to at least one remote antenna unit (RAU) is disclosed. The base unit comprises a downlink data source input configured to receive a downlink electrical data signal from a data source. The base unit further comprises an electrical-to-optical (E-O) converter configured to convert the downlink electrical data signal into a downlink optical data signal. The base unit further comprises an oscillator configured to generate an electrical carrier signal at a center frequency in the EHF band. The base unit further comprises a modulator. The modulator is configured to combine the downlink optical data signal with the electrical carrier signal to form a downlink modulated optical signal comprising the downlink optical data signal modulated at the center frequency of the electrical carrier signal. The modulator is further configured to send the downlink modulated optical signal to at least one RAU.

Figure 1:
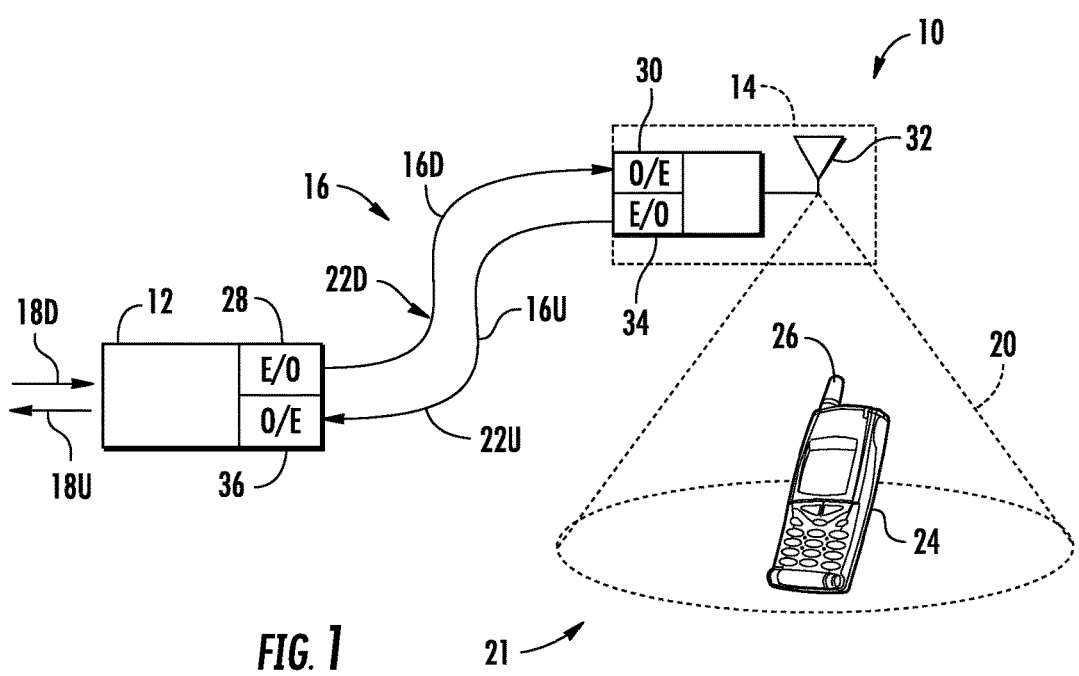
FIG. 1 is a schematic of an exemplary conventional distributed antenna system.
Figure 2:
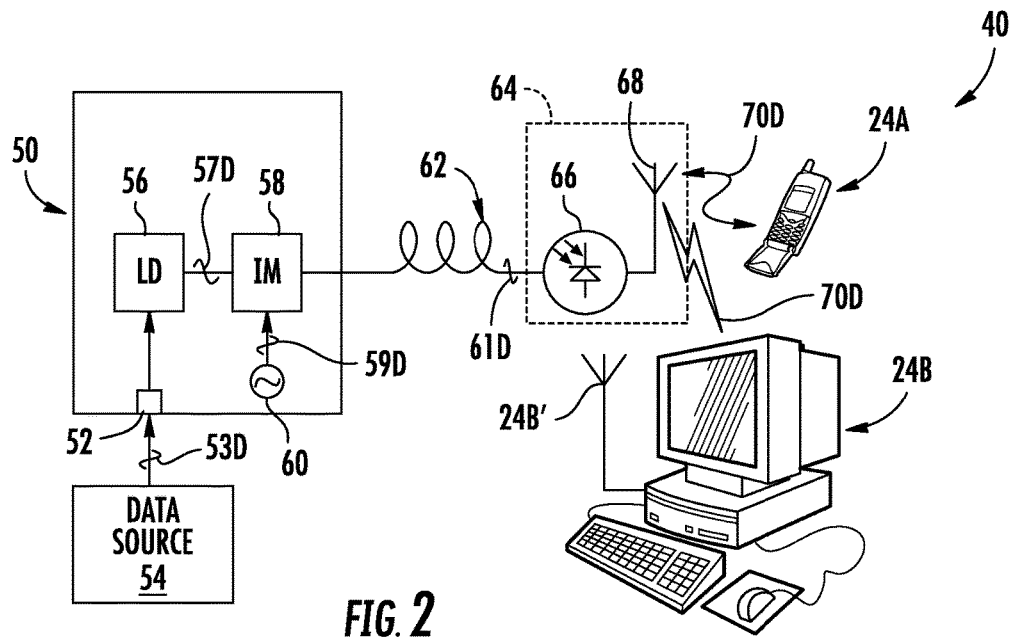
FIG. 2 is a schematic diagram of an exemplary distributed antenna system having a downlink the extremely high frequency band.

Before discussing examples of EHF radio over fiber systems, components, and methods that support provision of digital data services to wireless clients starting at FIG. 2, an exemplary distributed antenna system is described with regards to FIG. 1. The distributed antenna system 10 of FIG. 1 allows for distribution of radio frequency (RF) communications signals; however, the distributed antenna systems are not limited to distribution of RF communications signals. Also note that while the distributed antenna system in FIG. 1 discussed below includes distribution of communications signals over optical fiber, these distributed antenna systems are not limited to distribution over optical fiber. Distribution media could also include, but are not limited to, coaxial cable, twisted-pair conductors, wireless transmission and reception, and any combination thereof. Also, any combination can be employed that also involves optical fiber for portions of the distributed system.

In this regard, FIG. 1 is a schematic diagram of a conventional distributed antenna system 10. The distributed antenna system 10 is an optical fiber-based distributed antenna system. The distributed antenna system 10 is configured to create one or more antenna coverage areas for establishing communications with wireless client devices located in the RF range of the antenna coverage areas. In an exemplary embodiment, the distributed antenna system 10 may provide RF communication services (e.g., cellular services). As illustrated, the distributed antenna system 10 includes head-end equipment (HEE) 12 such as a head-end unit (HEU), one or more RAU 14, and an optical fiber 16 that optically couples the HEE 12 to the RAU 14. The RAU 14 is a type of remote communications unit. In general, a remote communications unit can support wireless communications or wired communications, or both. The HEE 12 is configured to receive communications over downlink electrical RF signals 18D from a source or sources, such as a network or carrier as examples, and provide such communications to the RAU 14. The HEE 12 is also configured to return communications received from the RAU 14, via uplink electrical RF signals 18U, back to the source or sources. In this regard, in this embodiment, the optical fiber 16 includes at least one downlink optical fiber 16D to carry signals communicated from the HEE 12 to the RAU 14 and at least one uplink optical fiber 16U to carry signals communicated from the RAU 14 back to the HEE 12.

One downlink optical fiber 16D and one uplink optical fiber 16U could be provided to support full-duplex multiple channels each using wave-division multiplexing (WDM), as discussed in U.S. patent application Ser. No. 12/892,424, entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the distributed antenna system 10 either in conjunction with RF communications signals or not.

The distributed antenna system 10 has an antenna coverage area 20 that can be disposed about the RAU 14. The antenna coverage area 20 of the RAU 14 forms an RF coverage area 21. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEE 12 includes a radio interface in the form of an electrical-to-optical (E-O) converter 28. The E-O converter 28 converts the downlink electrical RF signals 18D to downlink optical RF signals 22D to be communicated over the downlink optical fiber 16D. The RAU 14 includes an optical-to-electrical (O-E) converter 30 to convert the received downlink optical RF signals 22D back to electrical RF signals to be communicated wirelessly through an antenna 32 of the RAU 14 to client device 24 located in the antenna coverage area 20.

Similarly, the antenna 32 is also configured to receive wireless RF communications from client device 24 in the antenna coverage area 20. In this regard, the antenna 32 receives wireless RF communications from client device 24 and communicates electrical RF signals representing the wireless RF communications to an E-O converter 34 in the RAU 14. The E-O converter 34 converts the electrical RF signals into uplink optical RF signals 22U to be communicated over the uplink optical fiber 16U. An O-E converter 36 provided in the HEE 12 converts the uplink optical RF signals 22U into uplink electrical RF signals, which can then be communicated as uplink electrical RF signals 18U back to a network or other source.

As noted, one or more of the network or other sources can be a cellular system, which may include a base station or base transceiver station (BTS). The BTS may be provided by a second party such as a cellular service provider, and can be co-located or located remotely from the HEE 12.

In a typical cellular system, for example, a plurality of BTSs are deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell as other examples. In a particular exemplary embodiment, cellular signal distribution in the frequency range from 400 MHz to 2.7 GHz is supported by the distributed antenna system 10.

It may be desirable to provide distributed antenna systems that provide digital data services for client devices. For example, it may be desirable to provide digital data services to client devices located within a distributed antenna system. Wired and wireless devices may be located in the building infrastructures that are configured to access digital data services. Examples of digital data services include, but are not limited to, Ethernet, WLAN, WiMax, WiFi, DSL, and LT, etc. Ethernet standards could be supported, including but not limited to 100 Mb/s (i.e., fast Ethernet) or Gigabit (Gb) Ethernet, or ten Gigabit (10G) Ethernet. Examples of digital data services include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

It may also be desired to provide high-speed wireless digital data service connectivity with RAUs in a distributed antenna system. One example would be WiFi. WiFi was initially limited in data rate transfer to 12.24 Mb/s and is provided at data transfer rates of up to 54 Mb/s using WLAN frequencies of 2.4 GHz and 5.8 GHz. While interesting for many applications, WiFi has proven to have too small a bandwidth to support real time downloading of uncompressed high definition (HD) television signals to wireless client devices. To increase data transfer rates, the frequency of wireless signals could be increased to provide larger channel bandwidth. For example, an extremely high frequency in the range of 30 GHz to 300 GHz could be employed. For example, the sixty (60) GHz spectrum is an EHF that is an unlicensed spectrum by the Federal Communications Commission (FCC) and that could be employed to provide for larger channel bandwidths. However, high frequency wireless signals are more easily attenuated or blocked from traveling through walls or other building structures where distributed antenna systems are installed.

In this regard, FIG. 2 provides an exemplary distributed antenna system 40 that is configured to support broad band digital data services such as streaming HD video. In this regard, the distributed antenna system 40 includes a base unit 50. The base unit 50 has a downlink data source input 52 configured to receive a downlink data signal 53D from a data source 54. In an exemplary embodiment, the downlink data signal 53D is an electrical signal, although it could be optical, wireless, or in some other format as desired. In a further exemplary embodiment, the data source 54 is a high definition (HD) video data source and the downlink data signal 53D is a HD video signal. The data source 54 may be local or remote from the base unit 50. The base unit 50 receives the downlink data signal 53D through the downlink data source input 52 and converts the downlink data signal 53D to an optical signal using an E-O converter 56. In an exemplary embodiment, the E-O converter 56 may be a laser diode (LD) to form a downlink optical data signal 57D. In another exemplary embodiment, the E-O converter 56 may be a Mach-Zehnder electro-optic device.

With continuing reference to FIG. 2, the downlink optical data signal 57D is passed to an intensity modulator (IM) 58, which also receives an electrical carrier signal 59D from a local oscillator 60. The electrical carrier signal 59D is, in an exemplary embodiment, in the extremely high frequency range (i.e., 30 GHz-300 GHz) and in a further embodiment is approximately sixty (60) GHz. While FIG. 2 illustrates the local oscillator 60 as being positioned within the base unit 50, in an alternate embodiment, the local oscillator 60 may be remotely positioned. The intensity modulator 58 modulates the downlink optical data signal 57D with the electrical carrier signal 59D to create a downlink modulated optical signal 61D. The base unit 50 sends the downlink modulated optical signal 61D through an optical fiber 62 to one or more RAUs 64 (only one illustrated).

With continuing reference to FIG. 2, the RAU 64 receives the downlink modulated optical signal 61D and converts the downlink modulated optical signal 61D to a downlink modulated electromagnetic signal 70D using an optical-to-electrical (O-E) converter 66, which, in an exemplary embodiment, is a photodiode. The downlink modulated electromagnetic signal 70D is then transmitted through an antenna 68 to one or more client devices 24 such as a mobile terminal 24A or a wireless enabled computer 24B. While not illustrated in FIG. 2, but illustrated in FIG. 4, the RAU 64 may include a low noise amplifier (LNA) to boost the signal prior to transmission through the antenna 68. In an exemplary embodiment, the wireless enabled computer 24B is equipped with an antenna 24B' to facilitate reception of the downlink modulated electromagnetic signal 70D as is well understood.

In the client device 24, the downlink modulated electromagnetic signal 70D is down-converted using a local oscillator operating at the carrier frequency, and the downlink data signal 53D is recovered and used as desired within the client device 24.

By providing the downlink modulated optical signal 61D in this manner, the downlink modulated electromagnetic signal 70D is also in the EHF band. Because of the nature of the distributed antenna system, the distance between the client device 24 and the RAU 64 is relatively small (e.g., <10 meters). Because typical channel width in the sixty (60) GHz range is seven (7) GHz, there is sufficient bandwidth to accommodate large data files or streaming data such as a HD video signal.

Empirical testing also indicates that this system performs better than a directly-modulated mm-wave radio over fiber system because the frequency response is dominated by the low-frequency response of the O-E converter 56. The high-speed modulator only impacts the link efficiency, and its frequency response has no impact on the overall frequency response of the link. Further, empirical testing reveals that no optical signal filtering is required for fiber spans in the range of five hundred (500) meters, which should be sufficient for most distributed antenna systems. Further note that in the broadcast mode, no uplink signal is required. Thus, conventional receivers could be eliminated from the base unit 50 and the RAU 64 if desired for such a system.

Figure 3:
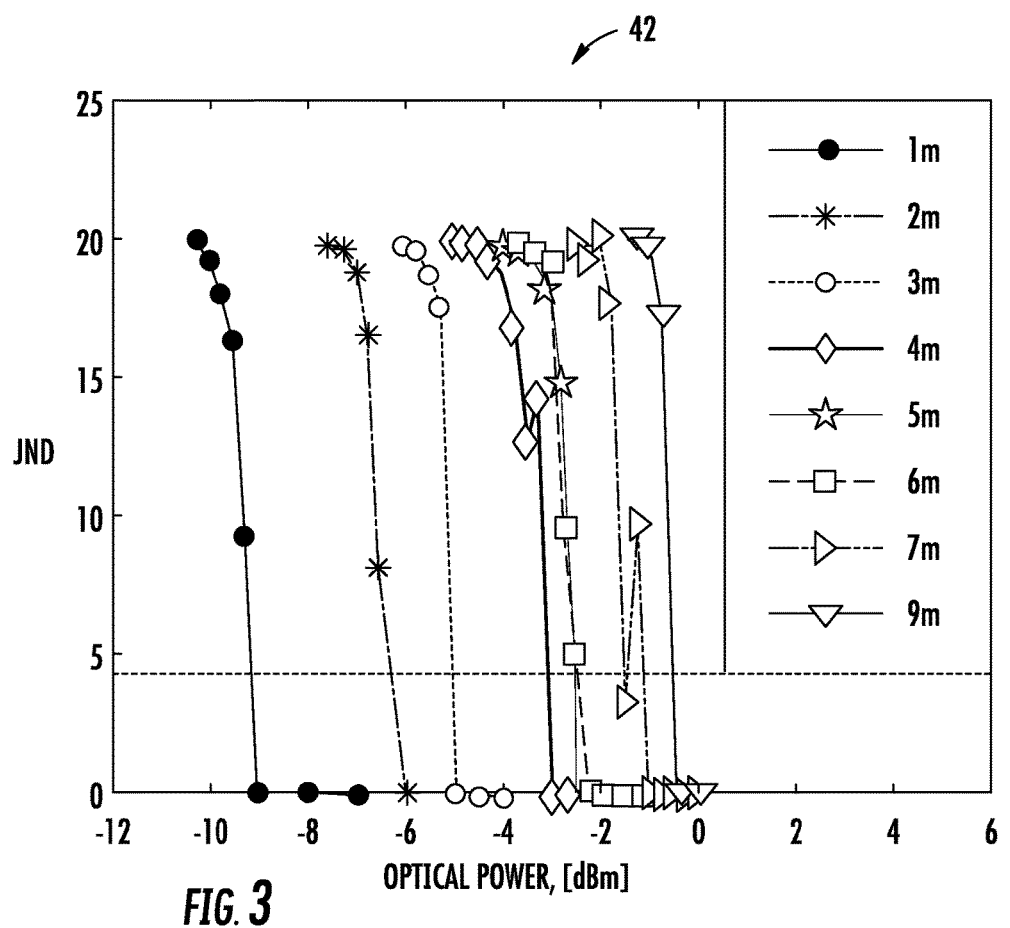
FIG. 3 is graph of just noticeable difference versus transmitted power for various distances showing performance profiles for various possible embodiments.

In specific exemplary testing, an uncompressed HD video signal was sent at various optical power levels, and the video quality at the client device 24 was evaluated using the just noticeable difference (JND) values. The results of this testing are presented as graph 42 in FIG. 3. It is generally accepted that JND values below 5 are considered acceptable. As is apparent from the data in FIG. 3, it is not difficult to achieve acceptable video signal transmission at ranges of ten meters from the RAU 64 at acceptable power levels.

Figure 4:
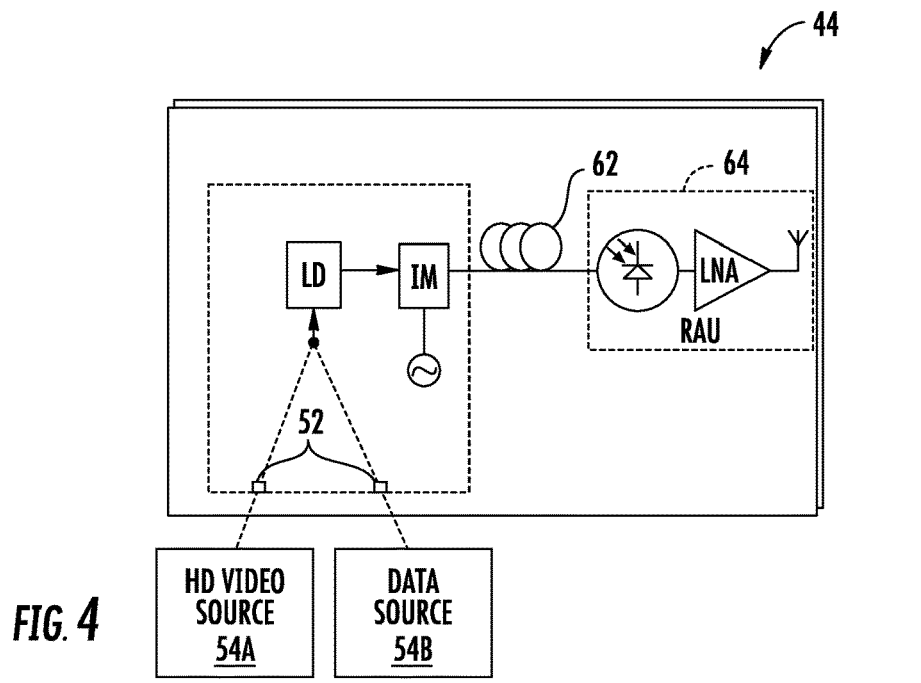
FIG. 4 is a schematic diagram of an alternate exemplary distributed antenna system having two data input sources.

FIG. 4 illustrates an alternate embodiment of a distributed antenna system 44 configured to support and distribute EHF communications signals. In this embodiment, the distributed antenna system 44 is configured to receive data input from a plurality of sources. In this regard, the downlink data source input 52 is configured to receive data input from a plurality of sources 54 such as HD video source 54A and data source 54B. The plurality of data sources 54 may be accommodated by having multiple ports on the base unit 50 or by having a combiner combine the signals from the data sources 54 into a single signal for the base unit 50. Further, in FIG. 4, the downlink data is provided on a single optical fiber 62.

Figure 5:
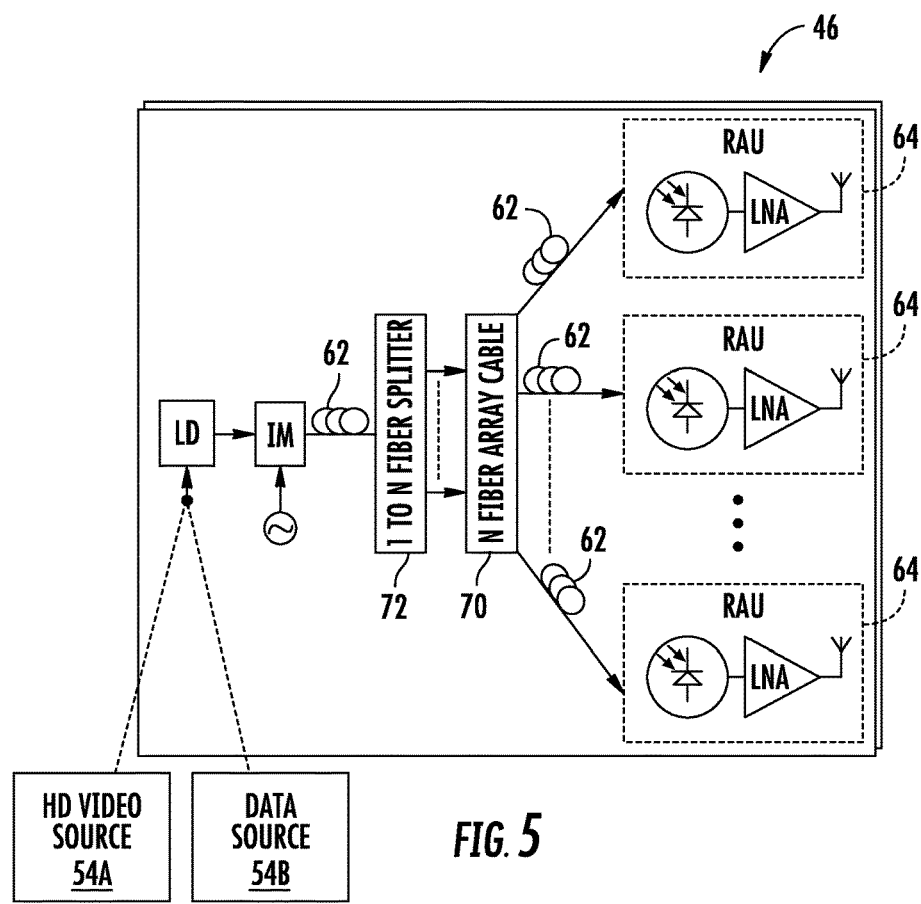
FIG. 5 is a schematic diagram of an alternate exemplary embodiment having a plurality of remote antenna units.

An alternate embodiment of a distributed antenna system 46 is illustrated in FIG. 5, wherein a plurality of optical fibers 62 is used so that a plurality of RAU 64 may receive optical signals. This arrangement allows a plurality of RAU 64 to receive optical signals. In an exemplary embodiment, the plurality of optical fibers 62 are arranged in an array cable 70, such as is used for in-building distribution of RAUs 64. A 1-to-N fiber splitter 72 may be used to separate the signals as desired onto the array cable 70.

Figure 6:
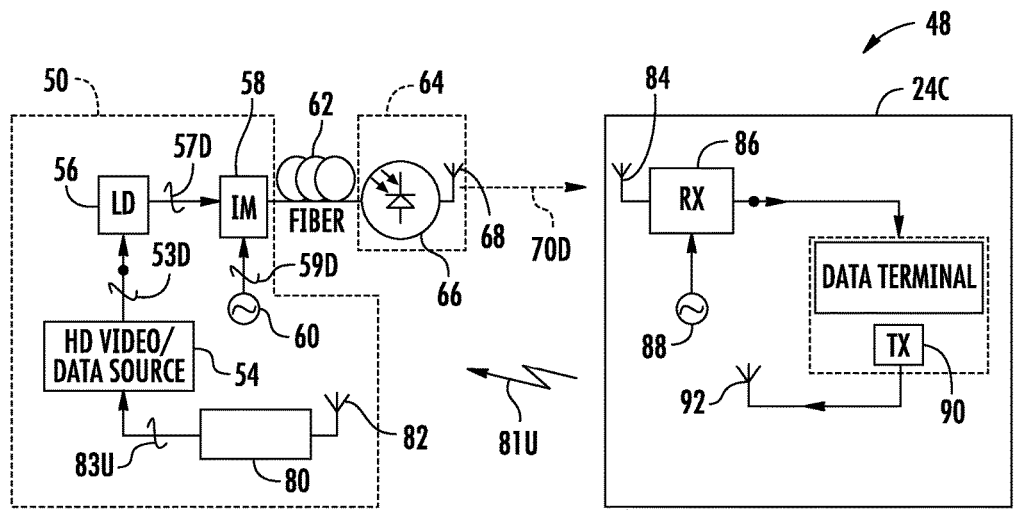
FIG. 6 is a schematic diagram of an alternate exemplary embodiment with an uplink connection.

FIG. 6 illustrates another alternate embodiment of a distributed antenna system 48 configured to support and distribute EHF communications signals. In this embodiment, there is an uplink connection from the remote client so as to allow bi-directional communication. That is, there is an uplink connection between the client device 24 and the base unit 50. In an exemplary embodiment, the uplink occurs at a substantially lower frequency than the downlink frequency. Because EHF operation may be power intensive and because the uplink signals typically do not contain large data packets, the uplink communications do not need to take place in the EHF band. Thus, conventional WiFi, WLAN, BLUETOOTH®, or other comparatively low frequency technologies may be used for the uplink signal.

In practice, the base unit 50 remains largely unchanged, but a receiver 80 is added. The receiver 80 may be positioned within the base unit 50 (illustrated), within an RAU 64 (not illustrated), or positioned remotely from the base unit 50 and the RAU 64, as desired. The receiver 80 is configured to receive uplink signal 81U through an antenna 82. The receiver 80 may further pass an uplink signal 83U to the data source 54, or other element within the system as desired.

Similarly, the client device 24C remains essentially unchanged on the downlink side from the previously described client device 24 in that the wireless client 24C receives the downlink modulated electromagnetic signal 70D through an antenna 84 with an EHF (e.g., 60 GHz) receiver 86, and downconverts the EHF signal using a local oscillator 88 and manipulates the embedded data as desired (e.g., plays HD video on a display). However, the client device 24C also includes a wireless transmitter 90, which transmits the uplink signal 81U through an antenna 92. Because EHF operation may be power intensive and because the uplink signals typically do not contain large data packets, the uplink communications do not need to take place in the EHF band. Thus, conventional WiFi, WLAN, BLUETOOTH®, or other comparatively low frequency technologies may be used for the uplink signal. As used herein the term "substantially lower than 60 GHz" or "substantially lower than EHF" is defined to be a frequency lower than 15 GHz. It should be appreciated that if there are multiple wireless clients 24 sending uplink signals 81U, then the receiver 80 is configured to receive such plurality of signals.

Figure 7A:
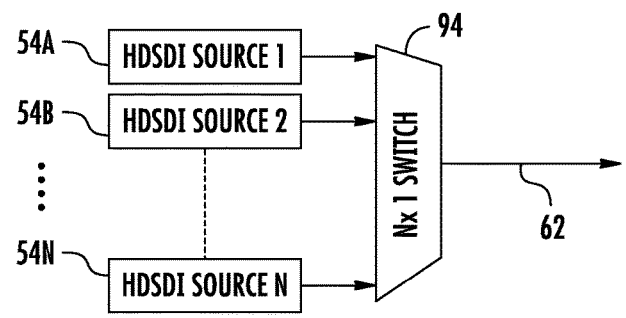
FIGS. 7A & 7B illustrate alternate methodologies for combining multiple data inputs.
Figure 7B:
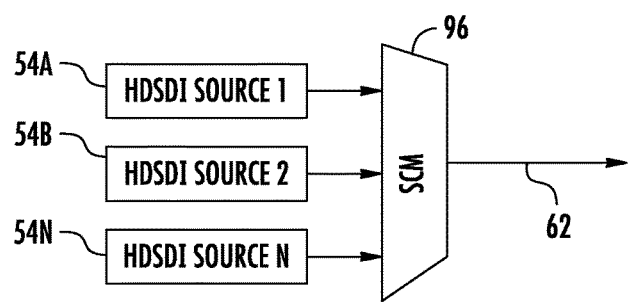

FIGS. 7A and 7B illustrate two alternate ways that multiple data signals may be multiplexed onto the single optical fiber 62 of the previous embodiments. In FIG. 7A, a N×1 switch 94 allows 1-to-N data sources 54A-54N to be coupled to the optical fiber 62. In FIG. 7B, a sub carrier multiplexing (SCM) switch 96 may be used. Still other techniques may be used as desired. Note that with 7 GHz channels, as a non-limiting example, it may be possible to have three (3) uncompressed HD video sources as inputs.

Figure 8:
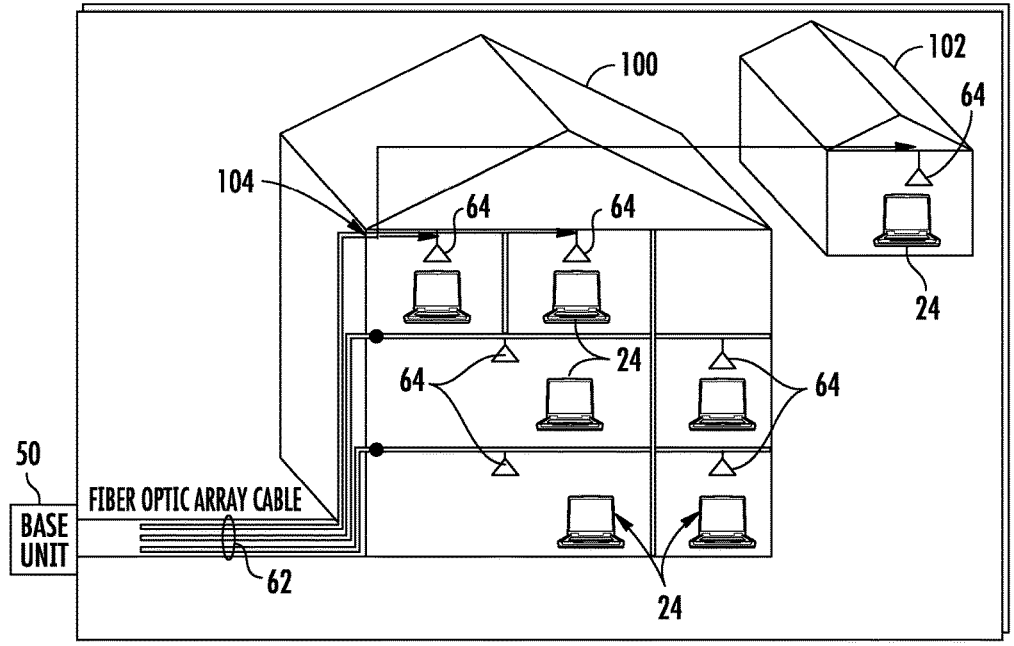
FIG. 8 illustrates an exemplary distributed antenna system within a building.

The system of the present disclosure has numerous applications, two of which are explicitly set forth with reference to FIGS. 8 and 9. In FIG. 8, a distributed antenna system according to the present disclosure, such as systems 40, 44, 46, or 48 can be configured to support and distribute EHF communications signals. In this embodiment, the system is installed in a building 100 and an outbuilding 102 so that remote clients may receive RF communications signals. A fiber optic cable 62 is an array cable and is coupled to a base unit 50 which may be positioned outside or remote from the building 100. The optical fiber 62 is connected to a plurality of RAUs 64 distributed throughout the building 100 and outbuilding 102. A splitter 104 allows the optical fiber 62 to be split as desired to extend the run to the outbuilding 102. A plurality of clients devices 24 are positioned within range of the RAUs 64 and can stream HD video signals or other data signals as desired. In this manner, users of client devices 24 may receive broad band digital data signals such as HD video signals despite the presence of the walls of the building 100 or outbuilding 102 which might otherwise attenuate such signals.

Figure 9:
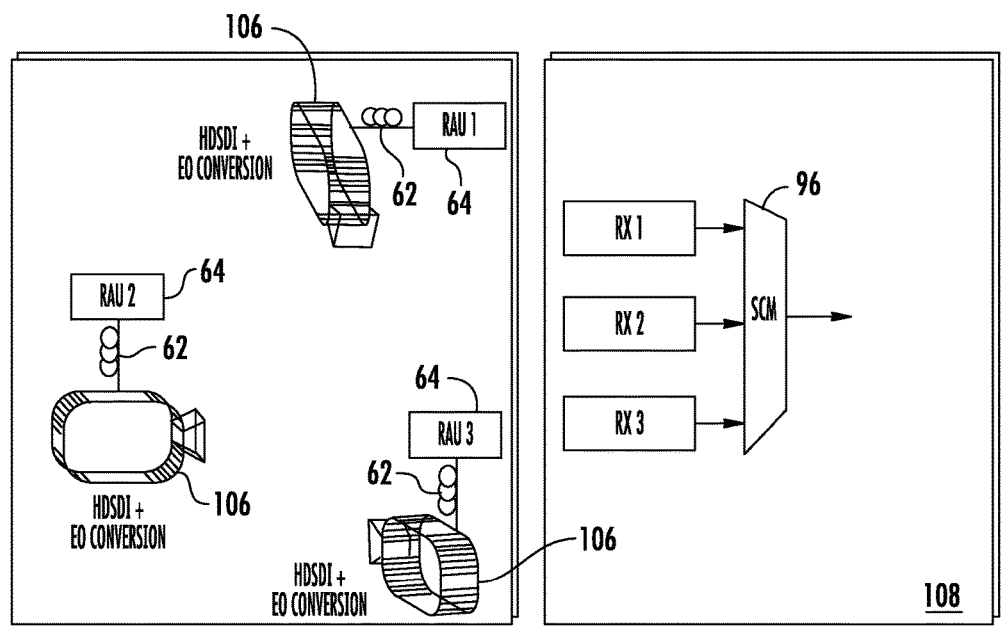
FIG. 9 illustrates an exemplary alternate embodiment using an outdoor high definition input.

In FIG. 9, a plurality of HD cameras 106 are effectively base units, coupled via respective optical fibers 62 to respective RAUs 64. The RAUs 64 transmit the signal to a processing station 108. As illustrated, the processing station 108 receives the three illustrated signals and combines them using a SCM 96, and conveys the combined signal to circuitry where the signals may be manipulated. Thus, the concepts of the present disclosure can be metaphorically inverted such that instead of downloading broad band digital data to a remote client, a plurality of remote cameras 106 may upload broadband digital data (e.g., an HD video signal) to a processing station 108.

Figure 10:
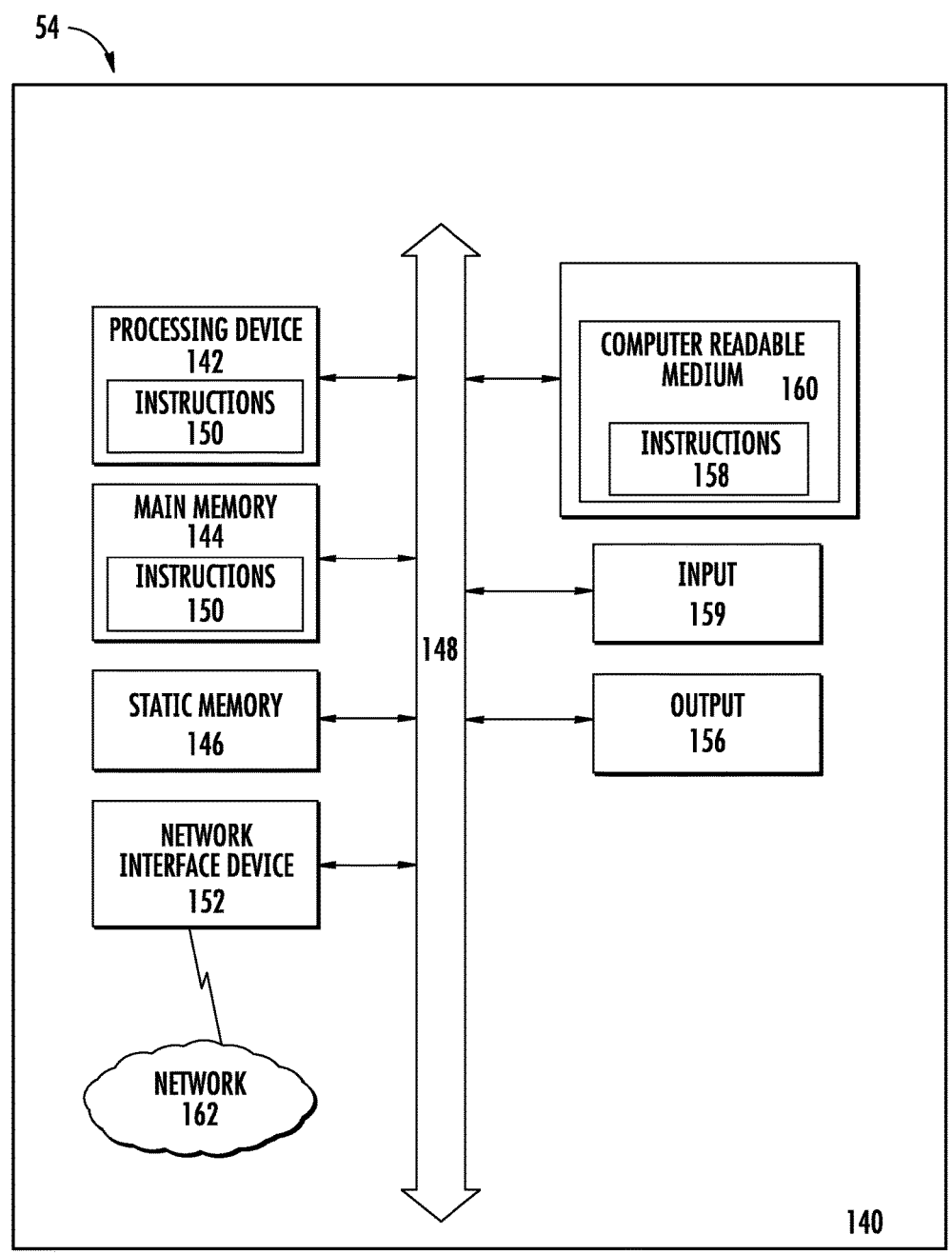
FIG. 10 is a schematic diagram of a generalized representation of an exemplary computer system that can be included in any of the digital data sources, remote antenna units, client devices and/or other modules provided in the exemplary distributed antenna systems and/or their components described herein, wherein the exemplary computer system is adapted to execute instructions from an exemplary computer readable medium.

FIG. 10 is a schematic diagram representation of additional detail regarding an exemplary RAU 64, client device 24 and/or elements adapted to execute instructions from an exemplary computer-readable medium to perform the location services described herein. In this regard, the RAU 64 or other element may include a computer system 140 within which a set of instructions for performing any one or more of the location services discussed herein may be executed. The computer system 140 may be connected (e.g., networked) to other machines in a LAN, an intranet, an extranet, or the Internet. The computer system 140 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The computer system 140 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 140 in this embodiment includes a processing device or processor 142, a main memory 144 (e.g., read-only memory (ROM), flash memory, dynamic random access memory (DRAM) such as synchronous DRAM (SDRAM), etc.), and a static memory 146 (e.g., flash memory, static random access memory (SRAM), etc.), which may communicate with each other via the data bus 148. Alternatively, the processing device 142 may be connected to the main memory 144 and/or static memory 146 directly or via some other connectivity means. The processing device 142 may be a controller, and the main memory 144 or static memory 146 may be any type of memory.

The processing device 142 represents one or more general-purpose processing devices such as a microprocessor, central processing unit, or the like. More particularly, the processing device 142 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 142 is configured to execute processing logic in instructions 150 for performing the operations and steps discussed herein.

The computer system 140 may further include a network interface device 152. The computer system 140 also may or may not include an input 154 to receive input and selections to be communicated to the computer system 140 when executing instructions. The computer system 140 also may or may not include an output 156, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 140 may or may not include a data storage device that includes instructions 158 stored in a computer-readable medium 160. The instructions 158 may also reside, completely or at least partially, within the main memory 144 and/or within the processing device 142 during execution thereof by the computer system 140, the main memory 144 and the processing device 142 also constituting computer-readable medium. The instructions 158 may further be transmitted or received over a network 162 via the network interface device 152.

While the computer-readable medium 160 is shown in an exemplary embodiment to be a single medium, the term "computer-readable medium" should be taken to include a single medium or multiple media (e.g., a centralized or distributed database, and/or associated caches and servers)

that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., ROM, random access memory ("RAM"), magnetic disk storage medium, optical storage medium, flash memory devices, etc.), a machine readable transmission medium (electrical, optical, acoustical, or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art would also understand that information and signals may be represented using any of a variety of technologies and techniques. For example, data, instructions, commands, information, signals, bits, symbols, and chips that may be references throughout the above description may be represented by voltages, currents, electromagnetic waves, magnetic fields, or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, jackets, or the like. The optical fibers disclosed herein can be single mode or multi-mode fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the forgoing descriptions and the associated drawings.

Therefore, it is to be understood that the description and claims are not to be limited to the specific embodiments disclosed, and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An apparatus for distributing extremely high frequency (EHF) modulated data signals to a plurality of remote units (RUs) distributed in a building infrastructure, comprising:
   a downlink input configured to receive at least one downlink optical data signal;
   an oscillator configured to generate an electrical carrier signal at a center frequency in an EHF band;
   a modulator configured to combine the at least one downlink optical data signal with the electrical carrier signal to form a downlink modulated optical signal comprising the at least one downlink optical data signal modulated at the center frequency of the electrical carrier signal, the modulator further configured to send the downlink modulated optical signal via a fiber optic array cable to two or more of the plurality of RUs in the building infrastructure and to at least one RU in an outbuilding separate from the building infrastructure; and
   an uplink receiver comprising at least one antenna, the uplink receiver configured to operate at a frequency substantially lower than EHF to receive uplink electromagnetic signals from a plurality of wireless clients located in the building infrastructure and from at least one wireless client located in the outbuilding through the at least one antenna,
   wherein the apparatus is configured to be positioned outside the building infrastructure.

2. The apparatus of claim 1, wherein the electrical carrier signal operates at approximately 60 GHz.

3. The apparatus of claim 1, wherein the uplink receiver is configured to operate according to a Wireless Fidelity (WiFi), a Wireless Local Area Network (WLAN), and/or a BLUETOOTH defined protocol.

4. A method for distributing extremely high frequency (EHF) modulated data signals to a plurality of remote units (RUs) distributed in a building infrastructure, comprising:
   receiving, in a base unit located outside the building infrastructure, at least one downlink optical data signal;
   combining, in the base unit, the at least one downlink optical data signal with an electrical carrier signal operating in an EHF band to form a downlink modulated optical signal comprising the at least one downlink optical data signal modulated at a center frequency of the electrical carrier signal;
   sending, from the base unit, the downlink modulated optical signal over a fiber optic array cable to the plurality of RUs located in the building infrastructure and to at least RU in an outbuilding separate from the building infrastructure; and
   receiving, at the base unit, an uplink electromagnetic signal from a plurality of wireless clients located in the building infrastructure and from at least one wireless client located in the outbuilding, the uplink electromagnetic signal having a frequency substantially lower than the EHF band.

5. The method of claim 4, further comprising converting the downlink modulated optical signal to a downlink electromagnetic signal at at least one RU of the plurality of RUs and sending the downlink electromagnetic signal to at least one wireless client.

6. The method of claim 4, wherein receiving the uplink electromagnetic signal from at least one wireless client of the plurality of wireless clients comprises receiving a Wireless Fidelity (WiFi), a Wireless Local Area Network (WLAN), and/or a BLUETOOTH uplink signal.

7. The method of claim 4, wherein the electrical carrier signal comprises a signal at approximately 60 GHz.

8. A system for distributing extremely high frequency (EHF) modulated data signals to at least one remote unit (RU), the system comprising:
   a downlink input configured to receive at least one downlink optical data signal;
   an oscillator configured to generate an electrical carrier signal at a center frequency in an EHF band; and
   a modulator configured to combine the at least one downlink optical data signal with the electrical carrier signal to form a downlink modulated optical signal comprising the at least one downlink optical data signal modulated at the center frequency of the electrical carrier signal;
   a plurality of remote units (RUs) distributed in a building infrastructure, each of the RUs comprising an antenna, each RU of the plurality of RUs configured to receive the downlink modulated optical signal from the modulator, convert the downlink modulated optical signal to a downlink modulated electromagnetic signal, and transmit the downlink modulated electromagnetic signal to a wireless client;
   at least one RU located in an outbuilding separate from the building infrastructure, the at least one RU located in the outbuilding comprising an antenna and configured to receive the downlink modulated optical signal from the modulator, convert the downlink modulated optical signal to a downlink modulated electromagnetic signal, and transmit the downlink modulated electromagnetic signal to a wireless client located in the outbuilding;
   at least one fiber optic array cable coupling the modulator to the plurality of RUs distributed in the building infrastructure and configured to carry the downlink modulated optical signal from the modulator to the plurality of RUs in the building infrastructure; and
   a splitter located in the building infrastructure configured to allow the at least one fiber optic array cable to be extended to the outbuilding so that the at least one fiber optic array cable is further configured to carry the downlink modulated optical signal from the modulator to the at least one RU in the outbuilding.

9. The system of claim 8, wherein at least one RU of the plurality of RUs further comprises an optical to electrical (O-E) converter configured to receive the downlink modulated optical signal and convert the downlink modulated optical signal to a downlink modulated electrical signal.

10. The system of claim 8, wherein the antenna of at least one RU of the plurality of RUs is remotely positioned relative to the modulator.

11. The system of claim 8, wherein the center frequency is approximately 60 GHz.

12. The system of claim 11, wherein a channel width associated with the downlink modulated optical signal is approximately 7 GHz.

13. A system for distributing extremely high frequency (EHF) modulated data signals to a plurality of remote units (RUs), the system comprising:
   a downlink input configured to receive at least one downlink optical data signal;
   an oscillator configured to generate an electrical carrier signal at a center frequency in an EHF band;
   a modulator configured to combine the at least one downlink optical data signal with the electrical carrier signal to form a downlink modulated optical signal comprising the at least one downlink optical data signal modulated at the center frequency of the electrical carrier signal;
   a plurality of RUs distributed in a building infrastructure, at least one RU of the plurality of RUs being optically coupled to the modulator and comprising:
      an optical to electrical (O-E) converter configured to receive the downlink modulated optical signal from the modulator and convert the downlink modulated optical signal to a downlink modulated electrical signal; and
      one or more antennas configured to transmit the downlink modulated electrical signal as an electromagnetic signal to a wireless client, and to receive uplink electromagnetic signals from a wireless client; and
   at least one RU located in an outbuilding separate from the building infrastructure, the at least one RU located in the outbuilding comprising:
      an optical to electrical (O-E) converter configured to receive the downlink modulated optical signal from the modulator and convert the downlink modulated optical signal to a downlink modulated electrical signal; and
      one or more antennas configured to transmit the downlink modulated electrical signal as an electromagnetic signal to a wireless client located in the outbuilding, and to receive uplink electromagnetic signals from a wireless client located in the outbuilding.

14. The system of claim 13, wherein at least one RU of the plurality of RUs is optically coupled to the modulator by at least one optical fiber, the center frequency is approximately 60 GHz, and a channel width associated with the downlink modulated optical signal is approximately 7 GHz.

15. The system of claim 13, wherein the downlink input is configured to receive a plurality of downlink optical data signals from a plurality of sources, the downlink optical data signals comprising at least one high definition video signal, the system further comprising a switch configured to multiplex the plurality of downlink optical data signals.

16. The system of claim 13, wherein the EHF band is between 30 and 300 GHz.

17. The system of claim 13, wherein the one or more antennas is configured to receive the uplink electromagnetic signals from the wireless client at a frequency substantially lower than the EHF band.

18. The system of claim 17, wherein the one or more antennas are configured to receive the uplink electromagnetic signals from the wireless client at a frequency lower than 15 GHz.

19. The system of claim 13, wherein the one or more antennas are configured to receive uplink Wireless Fidelity (WiFi), Wireless Local Area Network (WLAN), and/or BLUETOOTH signals.

20. The system of claim 13, wherein at least one RU of the plurality of RUs is configured to receive cellular telephone communications from one or more client devices.

\* \* \* \* \*